United States Patent
Ding et al.

(10) Patent No.: US 6,497,747 B1
(45) Date of Patent: Dec. 24, 2002

(54) PRODUCTION AND USE OF IMPROVED POLYIMIDE SEPARATION MEMBRANES

(75) Inventors: Yong Ding, Norwood; Benjamin Bikson, Brookline; Joyce Katz Nelson, Lexington, all of MA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/404,724

(22) Filed: Sep. 24, 1999

(51) Int. Cl.[7] .......................... B01D 53/22; B01D 21/64
(52) U.S. Cl. .................. 95/45; 95/51; 95/53; 95/54; 96/10; 96/13; 96/14
(58) Field of Search ................... 95/45, 47, 51, 95/53, 54; 96/4, 8, 10, 13, 14; 210/500, 39

(56) References Cited

U.S. PATENT DOCUMENTS

| | | | |
|---|---|---|---|
| 4,290,929 A | | 9/1981 | McGregor et al. ...... 260/29.2 N |
| 4,428,977 A | | 1/1984 | Peterson ...................... 427/120 |
| 4,440,643 A | | 4/1984 | Makino et al. .............. 210/500 |
| 4,467,001 A | | 8/1984 | Coplan et al. ............ 427/434.6 |
| 4,474,632 A | | 10/1984 | Makino et al. ........... 210/500.2 |
| 4,485,056 A | | 11/1984 | Makino et al. ................ 264/41 |
| 4,528,004 A | * | 7/1985 | Makino et al. ................ 96/13 |
| 4,705,540 A | * | 11/1987 | Hayes ............................ 95/51 |
| 4,717,393 A | * | 1/1988 | Hayes ............................ 95/51 |
| 4,717,394 A | * | 1/1988 | Hayes ........................ 95/51 X |
| 4,756,932 A | | 7/1988 | Puri ........................... 427/175 |
| 4,840,819 A | | 6/1989 | Williams et al. ............. 427/245 |
| 4,857,079 A | * | 8/1989 | Kimura .......................... 95/54 |
| 4,932,983 A | * | 6/1990 | Hayes ............................ 95/51 |
| 4,939,214 A | | 7/1990 | Imai et al. ................... 525/426 |
| 5,034,024 A | | 7/1991 | Hayes ............................ 55/16 |
| 5,042,992 A | * | 8/1991 | Blinka et al. .................. 95/51 |
| 5,042,993 A | * | 8/1991 | Meier et al. ................ 95/54 X |
| 5,061,298 A | * | 10/1991 | Burgoyne, Jr. et al. ......... 95/54 |
| 5,074,891 A | * | 12/1991 | Kohn et al. ..................... 95/47 |
| 5,076,916 A | | 12/1991 | Haubs et al. ................ 210/199 |
| 5,178,650 A | * | 1/1993 | Hayes ............................ 95/47 |
| 5,181,940 A | | 1/1993 | Bikson et al. .................. 55/16 |
| 5,234,471 A | * | 8/1993 | Weinberg ....................... 95/47 |
| 5,310,415 A | | 5/1994 | Simmons et al. .............. 95/45 |
| 5,322,549 A | * | 6/1994 | Hayes ............................ 95/45 |
| 5,348,569 A | | 9/1994 | Bikson et al. .................. 95/45 |
| 5,356,459 A | | 10/1994 | Bikson et al. .................. 95/54 |
| 5,591,250 A | * | 1/1997 | Stern et al. ..................... 95/51 |
| 5,693,227 A | * | 12/1997 | Costa ......................... 95/45 X |
| 5,719,253 A | | 2/1998 | Echigo et al. .............. 528/182 |
| 5,725,769 A | * | 3/1998 | Miller et al. ................ 95/47 X |
| 5,744,575 A | | 4/1998 | Nakanishi et al. .......... 528/353 |
| 5,928,410 A | * | 7/1999 | Jois et al. ................... 95/45 X |
| 5,969,087 A | * | 10/1999 | Maeda ....................... 95/45 X |

FOREIGN PATENT DOCUMENTS

| | | |
|---|---|---|
| EP | 0370509 | 5/1990 |
| EP | 0747418 A1 | 12/1996 |
| EP | 0750939 A2 | 1/1997 |
| EP | 0811421 A1 | 12/1997 |

OTHER PUBLICATIONS

Reynolds et al., "Amine Salts of Polypyromellitamic Acids", Joournal of Polymer Science: Part C No. 23, pp. 45–56 (1968).

Kreuz et al. "Studies of Thermal Cyclizations of Polyamic Acids and Tertiary Amine Salts", Journal of Polymer Science: part A–1, vol. 4, 2607–2616 (1966).

Miroslav Marek Jr. et al., "Ultra–thin polyimide film as a gas–separation layer for composite membranes", Polymer Communications, vol. 37, No. 12, 1966.

Yoshiaki Echigo et al., "Preparation of Poly (Bis(Trialkylammonium) 4,4'–Oxydiphenylenepyromellitamate) Films: A Useful Polyimide Precursor Film", Journal of Polymer Science: Part A: Polymer Chemistry, vol. 35.

Polotskaya et al, "The Effect of Imidization on Gas–Separation Properties of Membranes Based on Poly (4,4'–oxydiphenylene) pyromellitimide", Polymer Science, Ser. B. vol. 38, Nos. 7–8 (1996) pp 281–284.

Polotskaya et al, "Gas Transport Properties and Structural Order of Poly (4,4'–oxydiphenylene) pyromellitimide in Composite Membranes", Separation and Purification Technology 14 (1998) pp 13–18.

* cited by examiner

*Primary Examiner*—Robert H. Spitzer
(74) *Attorney, Agent, or Firm*—Robert J. Follett

(57) ABSTRACT

A process for preparing polyimide gas separation membranes is disclosed. The process involves preparing polyamic acid salt membrane precursors that are converted into polyimide membranes by mild thermal or chemical treatments. The gas separation processes that utilize these polyimide membranes are further disclosed.

31 Claims, 9 Drawing Sheets

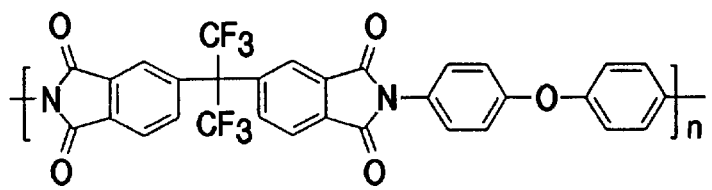
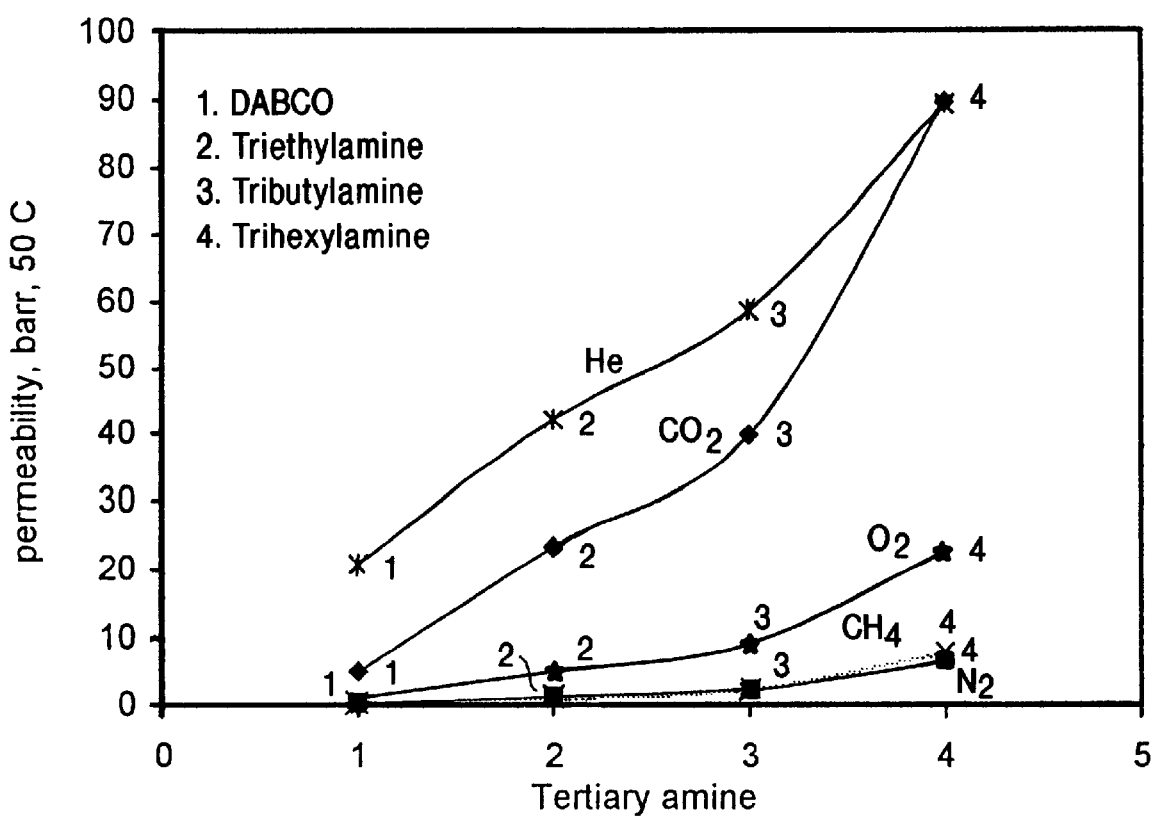
FIG. 8

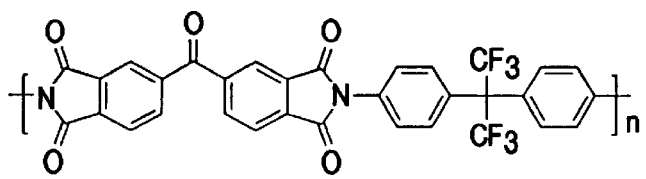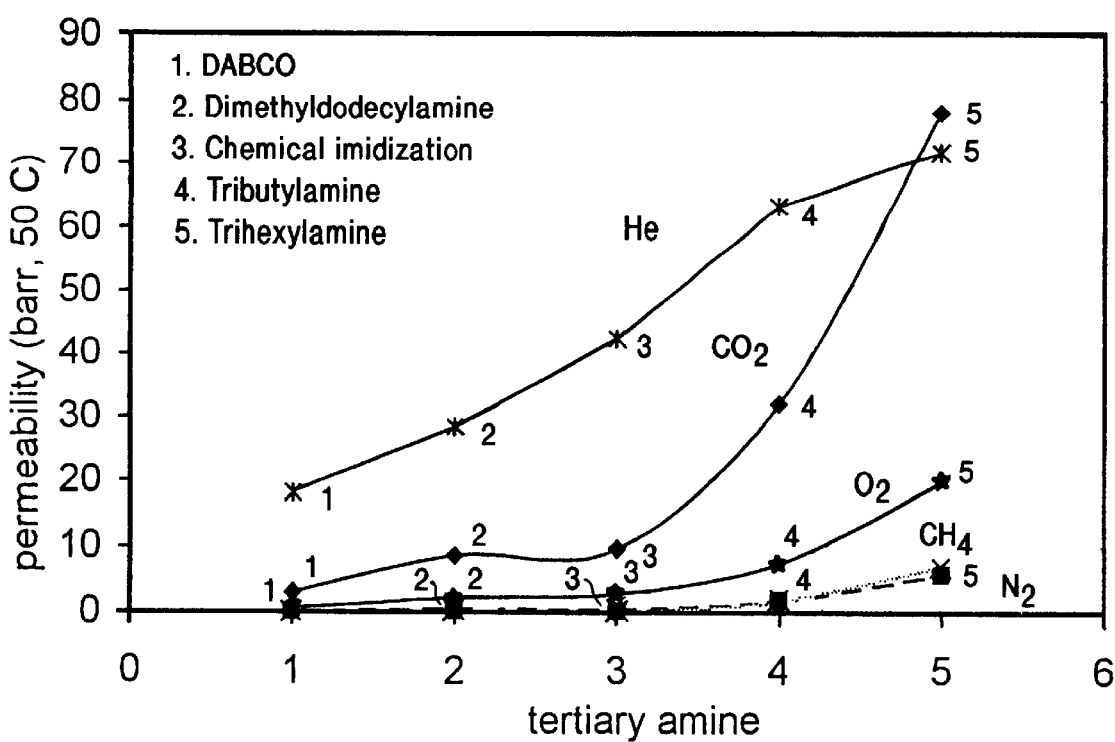
FIG. 9

US 6,497,747 B1

PRODUCTION AND USE OF IMPROVED POLYIMIDE SEPARATION MEMBRANES

FIELD OF INVENTION

This invention describes the preparation of improved polyimide gas separation membranes and gas separation processes that utilize these membranes. Specifically, soluble polyamic acid salt (PAAS) precursors comprised of tertiary and quaternary amines, ammonium cations, sulfonium cations, or phosphonium cations, are prepared and fabricated into membranes that are subsequently imidized and converted into rigid-rod polyimide membranes with desirable gas separation properties. A method of tailoring membrane gas separation and permeation characteristics by controlling the imidization process and PAAS counter ion selection without changing the chemical structure of the polyimide membrane is also disclosed.

BACKGROUND OF THE INVENTION

The use of polymeric membranes for gas separation applications is well documented in the art. The relationship between the polymeric structure and the gas separation properties has been extensively studied, see for example, W. J. Koros, Journal of Membrane Science, Volume 83, pp1, 1993; L. M. Robeson, Journal of Membrane Science, Volume 62, pp165, 1991; and L. M. Robeson, Polymer, Volume 35, pp4970, 1994. It is well documented in the art that stiffening the polymeric backbone while simultaneously inhibiting chain packing can lead to improved gas permeability combined with an increase in gas selectivity for certain gas mixtures. Polyimides are examples of such rigid-rod polymers showing desirable gas separation properties, see for example, D. R. B. Walker and W. J. Koros, Journal of Membrane Science, Volume 55, page 99, 1991; S. A. Stern, Journal of Membrane Science, Volume 94, page 1, 1994; K. Matsumoto, P. Xu, Journal of Applied Polymer Science, Volume 47, page 1961, 1993,). U.S. Pat. Nos. 4,705,540; 4,717,393; 4,717,394; 5,042,993; and 5,074,891 disclose the preparation of such aromatic polyimide gas separation membranes. For practical industrial applications polymeric gas separation membranes are fabricated into an asymmetric or a composite configuration with thin separation layers. The membranes can be further configured into flat sheets or into hollow fibers. Although rigid-rod polyimides have excellent gas separation properties, they frequently can be dissolved only in aggressive organic solvents such as N-methyl-pyrrolidinone (NMP), N,N-dimethyl formamide (DMF), or phenols which makes it difficult to prepare composite membranes with ultrathin separation layers and can further cause environmental problems. For example, polyimide membranes have been fabricated from chlorophenol solutions as described in U.S. Pat. No. 4,440,643.

U.S. Pat. Nos. 5,618,334; 5,725,633; and 5,744,575 disclose modified polyimides containing sulfonic acid groups that exhibit improved solubility in common organic solvents. U.S. Pat. Nos. 4,440,643 and 5,141,642 disclose the process of fabricating polyimide gas separation membranes from polyamic acid precursors. However, polyamic acids can undergo degradation and are sensitive to temperature and moisture variations, which makes the manufacturing of polyamic acid membranes that exhibit reproducible properties most difficult. Furthermore, some polyamic acids are not soluble in mild organic solvents, and all polyamic acids require harsh conditions to complete imidization. For example, temperatures as high as 300° C. are generally required to complete imidization of polyamic acids by thermal treatment. The limited availability of solvent systems and high imidization temperatures prohibits the application of polyamic acid precursors as the coating material for the fabrication of composite polyimide membranes when preferred, readily available polymeric substrates, such as polysulfone are used. To maintain the high porosity of the porous substrate the thermal imidization temperature must be lower than the glass transition temperature ($T_g$) of the porous substrate polymer. Most of the commercially employed polymeric substrates have glass transition temperatures below 200° C., for example, the $T_g$ of polysulfone is 190° C.

It is known in the art that polyimide polymers can be prepared from polyamic acid salt precursors. U.S. Pat. Nos. 4,290,929 and 5,719,253 disclose the use of polyamic acid solutions of tertiary amine. The following publications also disclose the synthesis of polyamic acid salts: R. J. W. Reynolds and J. D. Seddon, Journal of Polymer Science, Part C, Volume 23, pp45, 1968; and J. A. Kreuz, A. L. Endrey, F. P. Gay, and C. E. Sroog, Journal of Polymer Science, Part A-1, Volume 4, pp 2607, 1966; Y. Echigo, N. Miki, and I. Tomioka, Journal of Polymer Science, Polymer Chemistry, Volume 35, pp2493, 1997.

It has been taught in the art that amphiphilic polyamic alkylamine salts can form Langmuir-Blodgett (LB) films on water surfaces that subsequently can be converted into polyimide films, see, for example, U.S. Pat. No. 4,939,214 as well as Y. Nishikata, et al., Polymer Journal, Volume 20, pp269, 1988, and Y. Nishikata, et al., Thin Solid Films, Volume 160, pp15, 1988. Marek et al. disclose preparation of thin LB films for gas separation applications from dimethyldodecyl-ammonium and dimethylhexadecyl-ammonium polyamic acid salts, see M. Marek et al., Polymer, Volume 37, pp2577, 1996. The authors concluded that LB films with gas separation characteristics cannot be obtained from the short-chain tertiary amine salts of polyamic acid. Marek et al. found that to form LB films that exhibit gas separation property, one of the alkyl chains in the tertiary amine salt has to be longer than 16 carbon atoms to form an acceptable LB film. The use of polyamic acid salt precursors for membrane preparation in the prior art is thus limited to LB film techniques which are not practical for commercial membrane production due to the requirement of forming films on a water surface, then transferring such film to a porous substrate. Therefore, a need still remains for improved methods to prepare polyimide membranes, in particular methods that employ mild organic solvents and/or mild heat or chemical treatments in polyimide membrane preparation.

SUMMARY OF THE INVENTION

The present invention teaches an improved and industrially feasible method to fabricate polyimide gas separation membranes. In a preferred embodiment, the polyimide membranes of the present invention are produced by a two-step process, wherein: (a) a membrane is formed from a polyamic acid salt membrane precursor that contains the following units in its structure:

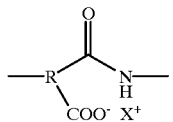

wherein R is a substituted or unsubstituted aromatic, alicyclic, heterocyclic, or aliphatic radical;

X is an ammonium ion, a phosphonium ion, a sulfonium ion, a protonated tertiary amine, a quaternary amine or mixtures thereof; the quaternary amine ion can be a heterocyclic, alicyclic or an aromatic amine ion or an ion of the following general formula: $R_1R_2R_3R_4N^+$; the protonated tertiary amine can be a heterocyclic amine, alicyclic amine, an aromatic amine or an amine of the following general formula: $R_1R_2R_3NH$ $R_1$, $R_2$, $R_3$ and $R_4$ can be the same or different and are aryl or alkyl radials; and (b) the membrane formed from the polyamic acid salt precursor is subsequently converted into the polyimide membrane by thermal or chemical treatment.

The invention is based on the unexpected findings that certain polyamic acid salts, preferably tertiary amine salts or quaternary salts of polyamic acids, have very good solubility in mild organic solvents and that the imidization of these polyamic acid salts can be realized at relatively mild thermal conditions. These characteristics are extremely useful for the fabrication of gas separation membranes, in particular, composite membranes.

In one embodiment of this invention, the polyimide gas separation membrane is produced by (a) preparing a membrane casting solution containing polyamic acid salt in at least one polar solvent; (b) forming a membrane configuration shaped as a flat sheet or as a hollow fiber from the polyamic acid salt solution; (c) conveying said membrane configuration through an evaporation zone; (d) bringing said membrane configuration into contact with a coagulating liquid to form a solidified membrane; (e) washing said solidified membrane to remove residual solvent; and (f) drying the solid membrane. (h) converting the polyamic acid salt membrane into a polyimide membrane by heat or chemical treatment. In a preferred embodiment, a caulking procedure may be further applied to the PAAS membrane surface, and/or to the surface of the polyimide membrane to repair defects and imperfections.

In another embodiment of the invention, a polyimide gas separation membrane is produced by (a) forming a solution of polyamic acid salt in a solvent system; (b) applying the thus formed solution to a porous substrate to form a coating layer; (c) solidifying the coating layer by drying or by immersing it into a nonsolvent followed by drying; and (d); converting the polyamic acid salt layer into a polyimide layer In a preferred embodiment, a caulking procedure may be applied to the membrane surface, and/or to the surface of the polyimide membrane to repair defects.

In a further embodiment of this invention, a porous polyimide membrane is formed by forming a porous polyamic acid salt membrane that is then converted into a porous polyimide membrane.

In an even further embodiment, the gas permeation characteristics of the polyimide membranes prepared according to the teaching of the present invention can be tailored by changing the counter ions in the PAAS precursors and by controlling the imidization process conditions. This feature allows one skilled in the art to modify the gas separation and permeation characteristics of polyimide membranes without utilizing the conventional method of modifying the chemical structures of the polyimides, an approach that is limited by the availability of monomers and the economics of the polymer synthesis.

Other features and advantages of the present invention will become apparent from the following description of the invention.

BRIEF DESCRIPTION OF THE DRAWINGS

FIG. 8 shows the effects of different tertiary amine counter ions utilized in PAAS precursors on the gas permeability coefficients of the 6FDA-ODA polyimide.

FIG. 9 shows the effects of different tertiary amine counter ions utilized in PAAS precursors on the gas permeability coefficients of the BTDA-6FDAn polyimide.

DETAILED DESCRIPTION OF THE INVENTION

Figure 1:
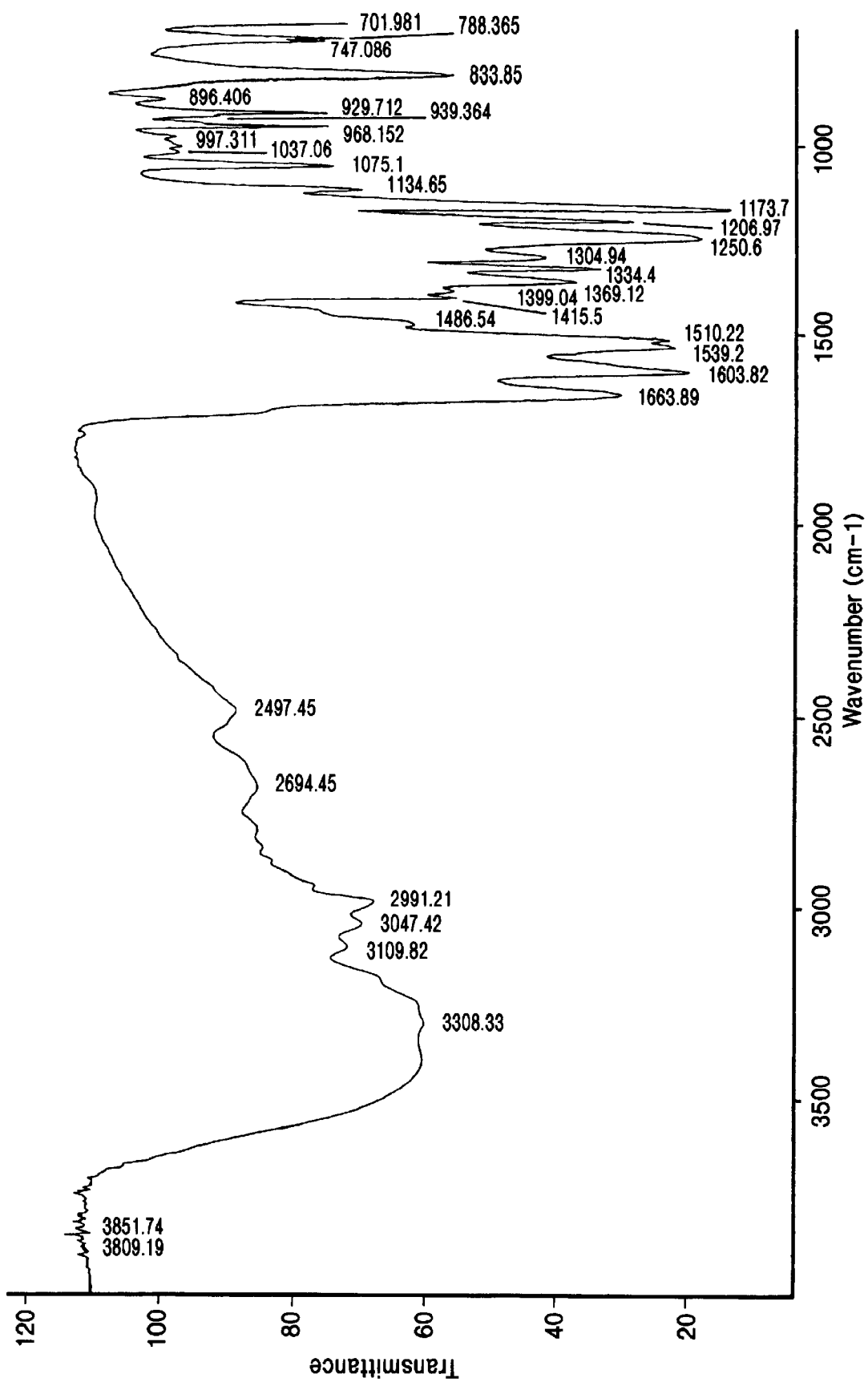
FIG. 1 shows the FT-IR spectrum of a film prepared from a polyamic acid salt (PAAS) with protonated triethylamine as the counter ion. The polyamic acid was prepared by reacting benzophenone dianhydride (BTDA) with hexafluoroisopropylidene dianiline (6FDAn).

According to the present invention, polyimide membranes can be fabricated by casting polyamic acid salt (PAAS) membrane precursors from mild solvents followed by imidization of the PAAS membrane utilizing mild thermal or chemical conditions.

Preferred solvents include common organic solvents with boiling points lower than 200° C. such as alcohols or ketones. Illustrative, but not limiting, examples are water, methanol, ethanol, n-propanol, isopropanol, n-butanol, n-pentanol, n-hexanol, cyclohexanol, ethylene glycol, ethylene glycol monomethylether, 2,2'-dimethoxyethyl ether, acetone, methy ethyl ketone, tetrahydrofuran, dioxane, and the like or mixtures thereof.

The solubility of the precursory polymer salts can be controlled by the counter ion selection. This feature is extremely useful in the manufacturing of composite and asymmetric membranes, as one skilled in the art will be able to tailor the solvents used in the preparation of membranes by adjusting the counter ions in the PAAS, which are easily prepared and isolated according to the teachings of the present invention. Another advantageous aspect of the present invention is that the PAAS's precursors can be converted into polyimides under very mild conditions, either by heat or chemical treatment.

The polyamic acids of this invention may be prepared by traditional methods known in the art. For example, polyamic acids can be prepared by reacting aromatic dianhydrides and aromatic diamines in an aprotic solvent. Aprotic solvents include, but are not limited to N,N'-dimethylformamide (DMF), N,N'-dimethylacetamide (DMAc), dimethylsulfoxide (DMSO), tetrahydrofuran/methanol mixture (THF/MeOH), and the like. Typically, the diamine is dissolved in the solvent first and then the dianhydride is added either in one portion or in small separated portions. The reaction is carried out under an inert atmosphere such as $N_2$ or Ar. Once a very viscous polyamic acid solution is obtained, the polyamic acid can be converted to PAAS, for example, by adding a tertiary amine or tetraalkylamine hydroxide solution to the reaction mixture. The thusly formed PAAS solution can be used to fabricate membranes directly, or if the solvent system is not compatible with the membrane preparation requirement, the PAAS polymer can be recovered by precipitation into a nonsolvent. Examples of such nonsolvents include, but are not limited to isopropanol, acetone, cyclohexanes, hexane and methylethylketone, and will depend on the polymer structure and the counter ion selection as will be recognized by those skilled in the art. The recovered PAAS polymers can be redissolved in a mild solvent and used for membrane preparation as described herein.

The polyamic acids of this invention may be prepared by traditional methods known in the art. For example, polyamic acids can be prepared by reacting aromatic dianhydrides and aromatic diamines in an aprotic solvent. Aprotic solvents include, but are not limited to N,N'-dimethylformamide (DMF), N,N'-dimethylacetamide (DMAc), dimethylsulfoxide (DMSO), tetrahydrofuran/methanol mixture (THF/MeOH), and the like. Typically, the diamine is dissolved in the solvent first and then the dianhydride is added either in one portion or in small separated portions. The reaction is carried out under an inert atmosphere such as $N_2$ or Ar. Once a very viscous polyamic acid solution is obtained, the polyamic acid can be converted to PAAS, for example, by adding a tertiary amine or tetraalkylamine hydroxide solution to the reaction mixture. The thusly formed PAAS solution can be used to fabricate membranes directly, or if the solvent system is not compatible with the membrane preparation requirement, the PAAS polymer can be recovered by precipitation into a nonsolvent. Examples of such nonsolvents include, but are not limited to isopropanol, acetone, cyclohexanes, hexane and methylethylketone, and will depend on the polymer structure and the counter ion selection as will be recognized by those skilled in the art. The recovered PAAS polymers can be redissolved in a mild solvent and used for membrane preparation as described herein.

Additional preferred polymers of the present invention include aromatic polyamide imides, polyhydrazine imides, and polyester imides. Aromatic polyimides are particularly useful for gas separation applications. The preferred aromatic polyimides of this invention are described by the following general formula, wherein n is an integer.

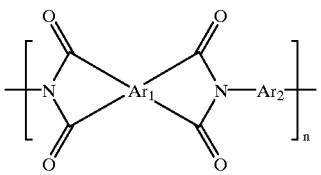

Where

is independently

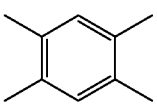 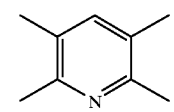

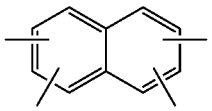 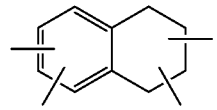

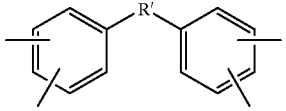

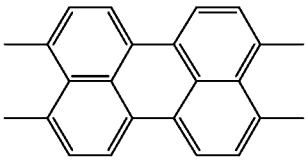

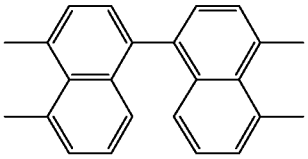

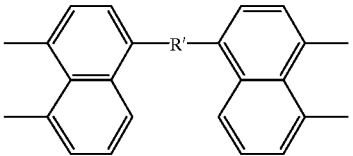

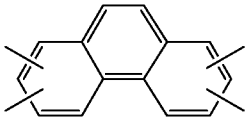

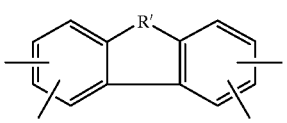

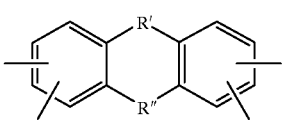

or mixtures thereof.

—R'— is

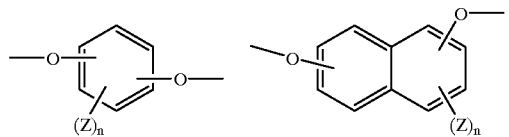
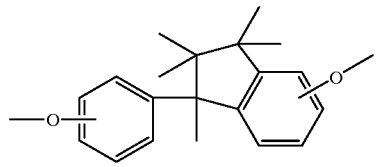
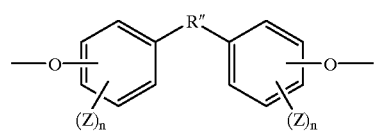
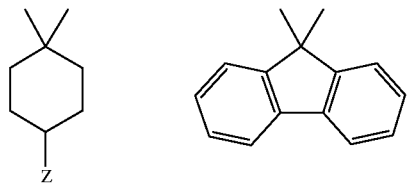
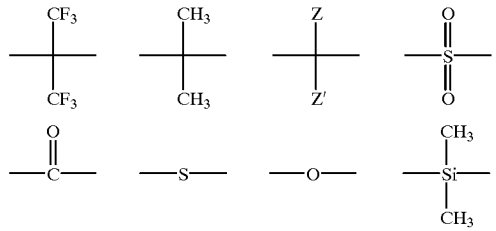
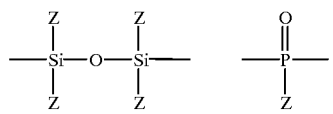

—R"— is

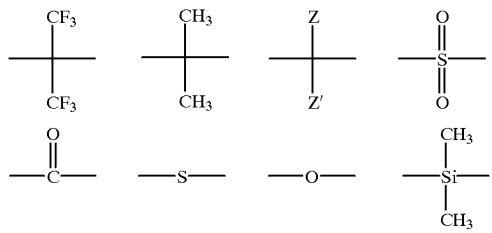
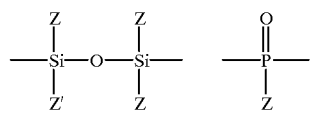

Z and Z' are:

—H, —$CH_3$, —$CH_2CH_3$, —$CH_2CH_2CH_3$, iso-propyl, iso-butyl, tert-butyl, —Br, —Cl, —F, —$NO_2$, —CN

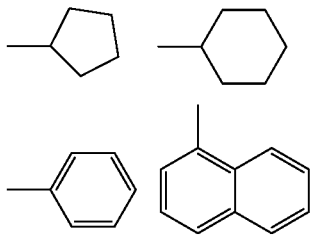

where —$Ar_2$— is independently

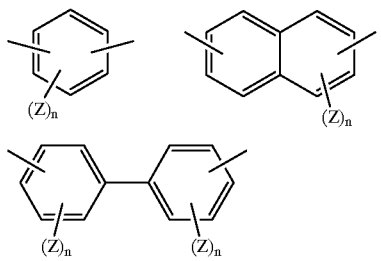
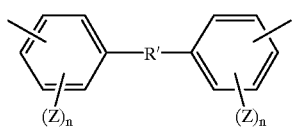
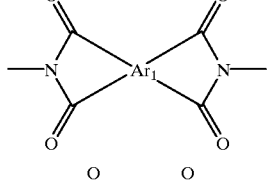

or mixtures thereof. Where $Ar_1$ is defined as above.
—$Ar_3$— is

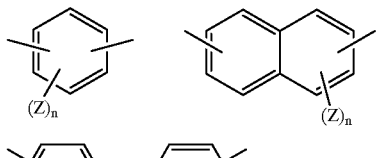
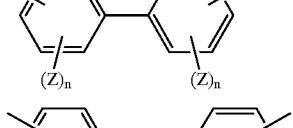
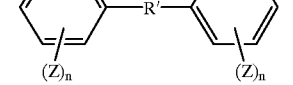

The polyimide membranes of this invention are formed from polyamic acid salt precursors. The counter ions in PAAS are derived from ammonia, quaternary amines, protonated tertiary amines, and sulfonium and phosphonium ions. Preferred PAAS counter ions include tetraalkylamine ions that can be heterocyclic, alicyclic, or aromatic amines or amines of the following general formula: $R_1R_2R_3R_4N^+$, wherein $R_1$ through $R_4$ can be the same or different and are organic radicals that can be alkyl or aryl radicals having at least 1 to 20 carbon atoms, more preferably from 1 to 15 carbon atoms. Those having 15 or fewer carbon atoms are preferred as they are soluble in the mild solvents preferred by the invention. Further, such materials have better membrane forming characteristics because they are less susceptible to cracking.

The organic radicals can also contain some functional groups such as —Cl, —F, —OH, —CHO, or bond linkages such as —O—, —S—, —CO— or —COO—. Illustrative but not limiting examples are tetramethyl-ammonium, tetraethyl-ammonium, tetra-n-propyl-ammonium, tetra-n-butyl-ammonium, trimethylhexyl-ammonium, trimethyldodecyl-ammonium, trimethylbenzyl-ammonium. These quaternary amine ions can be used either alone or in a mixture of two or more to form the counter ions in PAAS.

Suitable tertiary amines include heterocyclic, alicyclic or aromatic amines or amines of the following general formula: $R_1R_2R_3N$, wherein $R_1$, $R_2$ and $R_3$, may be the same or different but are as defined above. Illustrative examples of suitable amines are trimethylamine, triethylamine, tri-n-propylamine, tri-isopropylamine, N,N-dimethylhexylamine, N,N-dimethyldodecylamine, N,N-ethylethanol-amine, N-methyldiethanolamine, triethanol-amine, tri-n-butyl-amine, tri-n-hexyl-amine, tri-iso-octylamine, N,N,N',N'-tetramethyl-ethylenediamine, DABCO® (1,4-di-aza-bi-cyclo-[2,2,2] octane), pyridine, imidazole, 1,2,4-triazole, benzimidazole, naphthimidazole, purine, quinoline, isoquinoline, pyridazine, phthalazine, quinazoline, cinnoline, naphthylidine, acridine, phenanthridine, benzoquinoline, benzisoquinoline, benzocinnoline, benzophthalazine, benzoquinazoline, phenanthroline, phenazine, carboline, perimidine, 2,2'-dipyridyl, 2,4'-dipyridyl, 4,4'-dipyridyl, 2,2'-diquinolyl, 2-hydroxypyridine, 3-hydroxypyridine, 4-hydroxypyridine, 2-hydroxyquinoline, 3-hydroxyquinoline, 4-hydroxyquinoline, 5-hydroxyquinoline, 6-hydroxyquinoline, 7-hydroxy-quinoline, 8-hydroxyquinoline, picolinamide, nicotinamide, isonicotinamide, N,N-dimethylnicotinamide, N,N-diethylnicotinamide, N,N-dimethylisonicotinamide, N,N-diethylisonicotinamide, hydroxynicotinic acid, picolinic ester, nicotinic ester, isonicotinic ester, 2-pyridine sulfonamide, 3-pyridine sulfonamide, 4-pyridine sulfonamide, picolinaldehyde, nicotinaldehyde, isonicotinaldehyde, 3-nitropyridine, 3-acetoxypyridine, 2-aminopyridine, 3-aminopyridine, 4-aminopyridine, picolinaldoxime, nicotinaldoxime, isonicotinaldoxime, 2-(hydroxymethyl)pyridine, 3-(hydroxymethyl)pyridine, 4-(hydroxymethyl)pyridine, 4-(hydroxymethyl)pyridine, 3-(hydroxyethyl)pyridine, 4-(hydroxyethyl)pyridine, 3-hydroxy-pyridine-N-oxide, 4-hydroxypyridine-N-oxide, 4-hydroxyquinoline-N-oxide, N-hydroxypyrrole-2,5-dione, N-hydroxyisoindole-1,3-dione, N-hydroxypyrrolidine-2-5-dione, N-hydroxybenz(de)isoquinoline,1,3-dione, and the like.

The tertiary amines can be used alone or as a mixture of two or more to form the counter ions in PAAS. Tertiary and quaternary polyamic acid salts are the preferred embodiments of the present invention. However, other polyamic acid salts, such as sulfonium salts and phosphonium salts, are also within the scope of the present invention. Furthermore, the PAAS of this invention can comprise a mixture of any of the aforementioned salts.

The amount of neutralized carboxylic acid groups in the precursor polymer can be in the range of 10 to 100%, preferably in the range of 30 to 100%. However, PAAS membrane casting formulations can contain amines or tetraalkylammonium hydroxide or its salts in excess of 100% naturalization. The membrane casting formulations can further contain additives that catalyze imide bond formation; examples of such cure accelerator additives are disclosed in U.S. Pat. Nos. 5,756,650 and 5,753,407.

It was found that relatively mild conditions are required to convert the polyamic acid salt membrane precursors into the final polyimide membranes. The temperatures utilized to convert a PAAS membrane into a polyimide membrane by heat treatment are in the range of 50 to 300° C., preferably in the range of 100 to 200° C. Indeed, it was surprising that in some embodiments, conversion into a polyimide could be obtained even at temperatures as low as 100° C. This feature makes the preparation of polyimide membranes by the methods of the present invention extremely attractive. The heat treatments can be accomplished by microwave, radio frequency (RF) or infra-red heating, or by conveying the PAAS membrane precursors through a controlled temperature heating oven, preferably at a constant speed (the oven can contain several temperature zones), or by placing membranes into a heating oven and executing a controlled heat treating protocol.

In some embodiments, a multi-step process that combines the heating procedures described above is advantageously employed. When the heat treating oven is employed, the heat treatment time can be in the range of 0.1 to 100 hours, preferably from 10 to 30 hours, the length of the treatment being dependent on the temperature applied as well as on the PAAS structure. Advantageously, a step-wise heating or temperature ramp-up process can be employed to avoid excessively fast release of the volatile species formed during the imidization reaction that can otherwise cause foam formation or produce large voids in the polyimide product. For example, the precursory PAAS is first treated at a relatively low temperature of about 100° C. followed by a final heat treatment at about 150° C. Some PAAS precursors may undergo degradation when heated in air at elevated temperatures. As such, it is preferred that the heat treatment of such PAAS precursors be carried out in an inert gas atmosphere, such as a nitrogen atmosphere, or under vacuum. The rate of temperature increase during the heat treatment process can effect the gas permeation characteristics of the polyimide membrane. It was found that in some embodiments, it is advantageous to employ a high rate of temperature increase that can lead to improved fast gas permeance as long as excessive foaming and void formation is avoided. Such rate depends upon the particular PAAS structure and film thickness, and can be determined by those skilled in the art through routine experimentation.

Alternatively, imidization of the precursor membrane can be carried out by treating the membrane with an organic anhydride, such as acetic anhydride, propionic anhydride, or the like. The chemical treatment may be carried out at ambient temperature. If necessary, a slightly elevated temperature or a catalyst may be utilized. The polyimide membranes formed by the methods of the present invention are typically more than 50% imidized, preferably more than 80% imidized. Alternatively, one can use a blend of un-imidized and imidized polyimides.

The polyamic acid salts of this invention can be fabricated into different membrane shapes such as flat sheets or hollow fibers. Furthermore, the membranes can be porous or dense and composite or asymmetric in structure, including the multicomponent structure.

The low imidization temperature and high solubility of PAAS's in common polar solvents such as alcohols and ketones (as discussed above) makes these polymers very useful for the fabrication of porous membranes that can be shaped into flat sheet, tubular or hollow fiber forms. The porous polyimide membranes of this invention can be utilized directly in separation processes or used as substrates for the preparation of composite membranes. In preferred embodiments asymmetric porous membranes are formed and used directly for gas separations. Porous polyimide membranes are generally manufactured by the so-called phase inversion technique well known in the art.

In the present invention, the phase inversion can be induced by contacting PAAS solution with a nonsolvent or by a thermally induced phase separation, TIPS. Typically, PAAS is dissolved in a suitable solvent or mixture of solvents (such as those described above) and fabricated into a desired membrane shape such as flat sheet, tubular or hollow fiber. The porous PAAS membrane is formed by contacting the cast membrane shape with a nonsolvent. By the term "nonsolvent" we mean a solvent that cannot dissolve the polymer but has good miscibility with the solvent used to dissolve the polymer.

Alternatively, the PAAS solution used in the preparation of the porous membrane is formed in situ by adding, for example, a tertiary amine to the preformed polyamic acid solution, which is then fabricated into the porous membrane. In some embodiments the porous membrane is formed from partially imidized PAAS precursor.

It is also in the scope of the present invention to form porous membranes from the polyamic acids, PAA, and to convert the PAA into the polyamic acid salt which in turn is converted into the final porous polyimide membrane by imidization.

The process of this invention is most useful for the preparation of porous asymmetric integrally skinned membranes for gas separations wherein the polyimide material of the membrane substantially effects the separation. Such membranes contain nonporous dense regions within the membrane structure that are typically located at the membrane surface, but can be situated somewhat away from the surface sandwiched between porous nondiscriminating regions. These dense regions, or surface layers, are preferably nonporous or of extremely low surface porosity typically below $10^{-5}$, preferably below $10^{-6}$. Surface porosity is defined as a ratio of surface area occupied by pores to the total surface area of the membrane. The dense flow discriminating region is very thin and is frequently below 1000Å, preferably below 500Å.

Examples of preparation of porous asymmetric gas separation membranes can be found in U.S. Pat. Nos. 4,230,463; 5,085,676; and 5,181,940. The porous asymmetric membranes of the present invention are formed by the following general process: (a) a membrane casting solution is formed containing polyamic acid salt in at least one polar solvent; (b) the casting solution is shaped into a membrane configuration such as a flat sheet, tubular or a hollow fiber; (c) the membrane configuration is conveyed through an evaporation zone; (d) the cast membrane configuration is contacted with a coagulation fluid to form a porous solidified polyamic acid salt membrane; (e) the PAAS membrane is washed to remove residual solvent; (f) the PAAS membrane is dried, and (g) the PAAS membrane is converted into the polyimide membrane by thermal or chemical treatments.

It is well known in the art that the atmosphere of the evaporation zone and the duration of the evaporation step (c) can effect membrane structure and performance. In some embodiments, the process step (c) is totally omitted and the cast membrane is subjected directly to the solidification step (d). It is also well known in the art that it may be advantageous to dehydrate membranes solidified by coagulation into water utilizing solvent exchange procedures as part of the drying step as, for example, disclosed in U.S. Pat. Nos. 4,080,743; and 4,120,098. Thus it may be advantageous in some embodiments of this invention to subject the solidified and washed PAAS membranes of step (e) to a solvent exchange dehydration process. The phrase "the PAAS membrane is dried" in step (f) is inclusive of such solvent exchange dehydration processes.

The asymmetric polyimide membranes of this invention are formed from the precursory PAAS asymmetric membranes either by a heat treatment or by a chemical treatment. The heat treatment process is preferred. The low imidization temperature required for the process of the invention offers the advantage of maintaining the porosity of the asymmetric membrane intact. If a high immidization temperature must be used, as is the case for prior art polyamic acid and polyamic acid ester precursors, the porous structure tends to collapse and only a poor membrane is frequently obtained.

The hollow fiber configuration is a preferred membrane configuration for the polyimide membranes of the present invention because it allows for a high packing density of membrane area to be incorporated into a given volume. The porous polyimide hollow fibers of the present invention are prepared form porous PAAS hollow fiber precursors that are produced by a dry-wet spinning process well known in the art. Such a process uses a solution, commonly referred to as a sol, a spinning dope, or spinning solution, comprising a polymer mixed with a solvent vehicle comprised of one or more components to yield a mixture with a viscosity suitable for hollow fiber spinning. The sol usually consists of at least one solvent capable of dissolving the polymer along with one or more additives that may be nonsolvents, as is well known in the art. The hollow fibers are prepared by spinning polymeric solutions through an evaporation zone, frequently referred to as air gap, followed by solidification in a coagulation media.

The fiber forming solution or sols are prepared by dissolving the PAAS polymer in a solvent system that contains at least one additive such as a nonsolvent, a pore-forming agent, or a surfactant. The PAAS polymers of the present invention can be conveniently dissolved in a number of simple common solvents such as alcohols, aprotic solvents such as dimethylformamide and N-methylpyrrolidinone and their mixtures with water. The hollow fibers are solidified in a coagulation media that is typically a nonsolvent for the PAAS polymer. The preferred coagulation media is water. In some embodiments the coagulation media is a solvent/nonsolvent mixture. We have found that the counter ion in the PAAS polymer can be tailored to promote coagulation in the selected coagulation media. In particular, counter ions that contain long-chain hydrocarbon radicals promote porous membrane formation during coagulation in water. Examples of such counter ions include dimethyldodecyl-ammonium, dimethylhexadecyl-ammonium or other hydrophobic counterions.

The highly soluble polyamic acid salt precursors of this invention are useful in the manufacture of composite gas separation membranes. A composite membrane is frequently the membrane configuration of choice because it offers the advantage of using inexpensive, commercially available polymers as the porous substrate and a small amount of a specialty separation polymer as a coating layer. It is known in the art that one can tailor the gas separation properties of the composite membrane by changing the material of the thin separation layer, which can be a specialty polymer with advanced separation properties. Examples of methods of composite membrane preparation are provided in U.S. Pat. Nos. 5,076,916; 4,840,819; 4,826,599; 4,756,932 and 4,467,001. The substrate material used in preparing the composite membranes of the present invention can be a solid natural or synthetic substance; it can be further an organic or inorganic substance. The selection of the material may be based on heat resistance, solvent resistance, and/or mechanical strength. The selection of material may be further effected by the intended separation process; for example, whether the substrate material is intended to significantly effect the separation. Examples of suitable substrate materials include, but are not limited to, aromatic polyamides, aliphatic polyamides, polyesters, polycarbonates, copolycarbonates esters, polyethers, polyetherketones, polyetherimides, polyethersulfones, polyetheresters, polysulfones, polyvinylidene fluoride, polybenzimidazoles, polybenzoxazoles, polyacrylonitrile, polyazoaroaromatics, poly(2,6-dimethylphenylene oxide), polyphenylene oxides, polyureas, polyurethanes, polyhydrazides, polyazomethines, polyacetals, cellulosic derivatives cellulose acetates, cellulose nitrate, ethyl cellulose, styrene-acrylonitrile copolymers, brominated poly(xylene oxide), sulfonated poly(xylylene oxide), polyquinoxaline, polyamideimides, polyamideesters, polysiloxanes, polyacetylenes, polyphosphazenes, polyolefines, polyethylene, polypropylene, polyphenylenes, poly(4-methylpentene), poly(trimethylsilylpropyne), polyimides, polyesters and so called ladder polymers, blends thereof, copolymers thereof, substituted polymers thereof, and the like. Inorganic porous substrates including, but not limited to carbon, ceramic and silicas are also contemplated.

The preferred substrate configuration is a hollow fiber configuration that is used to form the composite polyimide hollow fiber membrane of the present invention. The substrate is preferentially porous and may contain up to 90% void volume and preferably about 20 to 70% based on the superficial volume. It is well known in the art that the coated surface of the substrate may be less porous or comprised of a small pore size than the bulk porosity. The substrate can be further precoated by a gutter layer, or contain solvents and nonsolvents therein to promote thin film coating layer formation. Mild solvents can be advantageously utilized in PAAS composite membrane may preparation. Such solvents generally include common organic solvents with boiling points lower than 200° C. The boiling points of solvents can be higher if the solvent is removed by a coagulation process. Illustrative, but not limited, examples are water, methanol, ethanol, n-propanol, isopropanol, n-butanol, n-pentanol, n-hexanol, cyclohexanol, ethylene glycol, ethylene glycol monomethylether, 2,2'-dimethoxyethyl ether, acetone, methy ethyl ketone, tetrahydrofuran, dioxane, and the like or mixtures thereof.

The preferred composite membranes of the present invention are fabricated by the following process: (1) a coating solution of the PAAS precursor is formed in a solvent system; (2) the coating solution is applied to a porous substrate to form a coating layer; (3) the coating layer is solidified by drying or by immersing the coated substrate into a nonsolvent, in some embodiments a combination of drying and immersion into washing nonsolvent can be employed; (4) the solidified PAAS composite membrane is treated either by thermal or chemical means to convert it into a composite polyimide gas separation membrane. Coating applicators well known in the art can be utilized to apply PAAS coating solution to the substrate. The coating layer can be solidified by drying, for example, by transporting the coated substrate through a drying oven. Alternatively the coating layer can be solidified by immersing the coated substrate into a nonsolvent, as described in U.S. Pat. No. 4,826,599. It is well understood that the solidification by immersion into a nonsolvent can be preceded by partial evaporation. In addition to solvents, the PAAS coating solutions can contain nonsolvents, surfactants and additives to promote optimal composite layer formation.

It is well known in the art that polymeric gas separation membranes can be treated to repair residual defects/imperfections. The treatments are frequently referred to generically as caulking and may include the application of a thin layer of a high gas permeability material, such as silicon rubber, over the thin membrane gas separation layer to block residual imperfections; it can further include solvent and surfactant treatments to collapse and block the residual surface pores, and the like caulking treatments. Examples of caulking methods are disclosed in U.S. Pat. Nos. 4,230,463; 4,767,422, and 5,034,024 incorporated herein by reference. The use of the term caulking herein is inclusive of all known methods of defect repair in gas separation membranes. The caulking process to block any residual imperfections in the gas separation layers of the composite and asymmetric membranes of the present invention can be carried out after the PAAS precursor membrane has been formed, after the PAAS precursor membrane has been converted into the polyimide membrane, or both.

We have also found unexpectedly that the size, volume and the nature of the counter ion in the PAAS precursors can effect the gas permeation and separation characteristics of the final polyimide membrane. Specifically, it was found that polyimide membranes prepared from PAAS precursors that contain large counter ions, for example, protonated trihexylamine, exhibit an increase in gas permeation rates for most gases as compared to the polyimide membranes prepared according to the teachings of prior art from fully imidized polyimides. On the other hand, if small counter ions are incorporated into PAAS precursors, such as protonated triethylamine, the gas permeation and separation characteristics of the final polyimide membrane can be similar to that of a polyimide membrane cast from a fully imidized polymer. Therefore, it is possible to tailor the gas separation and permeation characteristics of the polyimide membranes of the present invention simply by changing the nature of the counter ions in the PAAS precursor without making chemical modifications to the polyimide polymer structure. The gas permeation characteristics of the polyimide membrane can be further tailored by utilizing a mixture of counter ions in the PAAS precursors or by utilizing a partially neutralized PAA precursor. The membrane gas permeation characteristics can be further effected by the imidization process condition, in particular, the imidization temperature or temperature rate increase.

The polyimide membranes of the present invention are useful for numerous fluid separation applications including liquid, gas/liquid, vapor and/or gas separations. Gas separations include, but are not limited to oxygen/nitrogen separation, separation of hydrogen from hydrogen-containing gas streams, separation of carbon dioxide from carbon dioxide-containing gas streams, such as natural gas sweetening, hydrogen sulfide removal from natural gas streams, helium purification and gas drying.

The following examples will serve to illustrate the utility of this invention but should not be construed as limiting. The gas permeability of the flat sheet polyimide membranes was determined by the following procedure. In the test, the membrane to be tested was sandwiched between two aluminum foils exposing a 2.54 cm diameter area, placed in a permeation cell and sealed with epoxy resin. The downstream side of the cell was evacuated up to $2\times10^{-2}$ mmHg and the permeate feed gas was introduced from the upstream side. The pressure of the permeate gas on the downstream side was measured using an MKS-Barathon pressure transducer. The permeability coefficient P was calculated from the steady-state gas permeation rate according to the equation:

P=C×V×L×dp/dt×1/h

C=constant

V=volume of collection receiver

L=thickness of film h=upstream pressure dp/dt=slope of steady-state line

The permeability coefficient P is reported in Barrer units (1 Barrer=$10^{-10}$ cm$^3$ (stp) cm/cm$^2$ cmHg sec).

EXAMPLE 1

Figure 2:
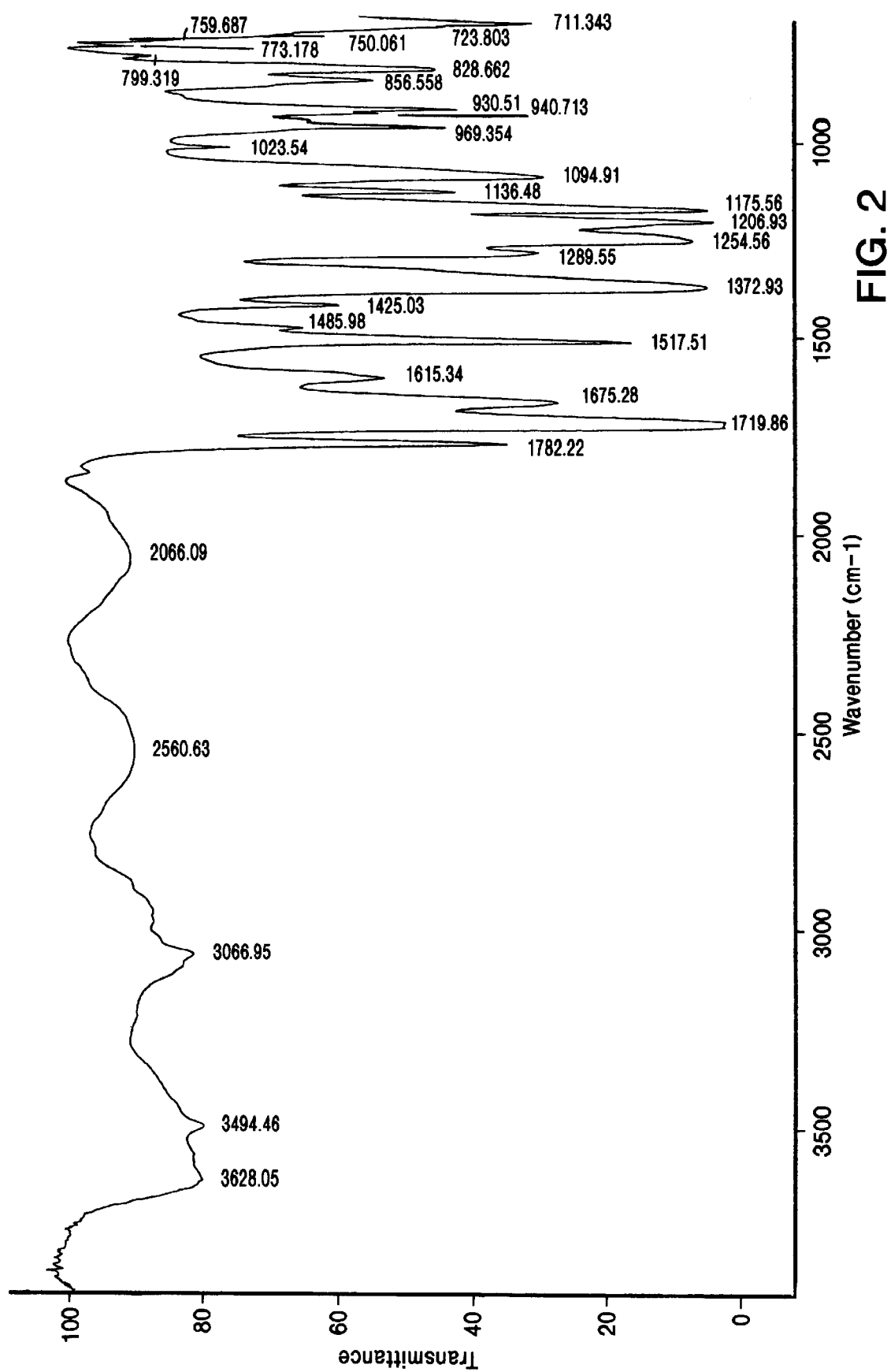
FIG. 2 shows the FT-IR spectrum of the polyimide film obtained from the BTDA-6FDAn, PAAS precursor, the IR spectrum of which is shown in FIG. 1. The film was prepared by heating the precursor film first at 100° C. overnight and then at 130° C. for 48 h under vacuum.

A 250 mL three-neck round-bottom flask equipped with a nitrogen inlet and a mechanical stirrer was charged with 5.0141 g of hexafluoroisopropylidene dianiline (6FDAn) and 30 mL of NMP. Once the dianiline was fully dissolved, 4.8335 g of benzophenonetetracarboxylic dianhydride (BTDA) powder was added by washing it down with 20 mL of NMP. The reaction mixture was stirred at room temperature for 24 h and a very viscous solution was formed. Triethylamine (5.0 mL) in 50 mL of NMP was added through a dropping funnel for over 20 minutes to the reaction mixture and the resulting solution was stirred for 6 h. A film was cast directly from this solution and dried by keeping it at 50° C. in an oven overnight. The film was dried at 100° C. for 17 h and then heat treated at 130° C. under vacuum for 2 days. The FT-IR spectra of the PAAS precursor and BTDA-F6DAn polyimide prepared by procedures analogous to those described in this example are shown in FIGS. 1 and 2. FT-IR and NMR analyses showed that the polymer was fully imidized. The gas permeation properties measured at 35° C. of the prepared film were determined to be as follows:

P(He)=31.6 barrers

P(H$_2$)=25.8 barrers

P(O$_2$)=2.7 barrers

P(N$_2$)=0.5 barrers

P(CH$_4$)=0.3 barrers

P(CO$_2$)=12.8 barrers

Overall, $\alpha$(O$_2$/N$_2$)=5.2, $\alpha$(CO$_2$/CH$_4$)=41.7.

COMPARATIVE EXAMPLE 2

The polyamic acid was synthesized as described in Example 1 and converted to polyimide by chemical imidization as follows: at the end of polymerization, 14.3 mL of acetic anhydride, 2.3 mL of triethylamine, and 20 mL of NMP were added to the reaction mixture and the solution was kept at room temperature for 24 h. White fibrous polymer was collected by pouring the solution into methanol and dried. A dense film from thus prepared polyimide was cast from the NMP solution by placing it in an oven set at 50° C. and the resulting film was further dried at 130° C. under vacuum for 2 days. The gas separation properties measured at 50° C. were determined to be as follows:

P(He)=42.3 barrers

P(O$_2$)=2.8 barrers

P(N$_2$)=0.5 barrers

P(CH$_4$)=0.3 barrers

P(CO$_2$)=9.7 barrers

Overall, $\alpha$(O$_2$/N$_2$)=5.7, $\alpha$(CO$_2$/CH$_4$)=37.3

The experiment indicates that polyimide membrane prepared by this invention is similar or superior to membranes prepared by the conventional process.

EXAMPLE 3

A 500 mL three-neck round-bottom flask equipped with a nitrogen inlet and a mechanical stirrer was charged with 10.01 g of oxy-4,4'-dianiline (ODA) and 100 mL of NMP. Once the dianiline was fully dissolved, 22.21 g of hexafluoroisopropylidene dianhydride (6FDA) powder was added by washing it down with 50 mL of NMP. Within one hour, the reaction mixture became very viscous and 50 mL of NMP was added to dilute the solution. The reaction mixture was stirred at room temperature for an additional 2 hours and 16.8 mL of triethylamine in 30 mL of NMP were added slowly into the reaction mixture, which was stirred for an additional 3 hours at room temperature. The solid polymer was recovered by precipitation into a large amount of methyl ethyl ketone (MEK) and dried. The PAAS films were cast on a clean glass from methanol and dried in a glove bag at room temperature; the PAAS film was released from the glass and further dried under vacuum at 50° C. overnight. Polyimide film was obtained by treating the PAAS film at 80° C. for 8 h and then at 150° C. for 24 h under vacuum. The gas permeation properties of the polyimide film were tested at 50° C. and the results listed in Table 1.

Figure 3:
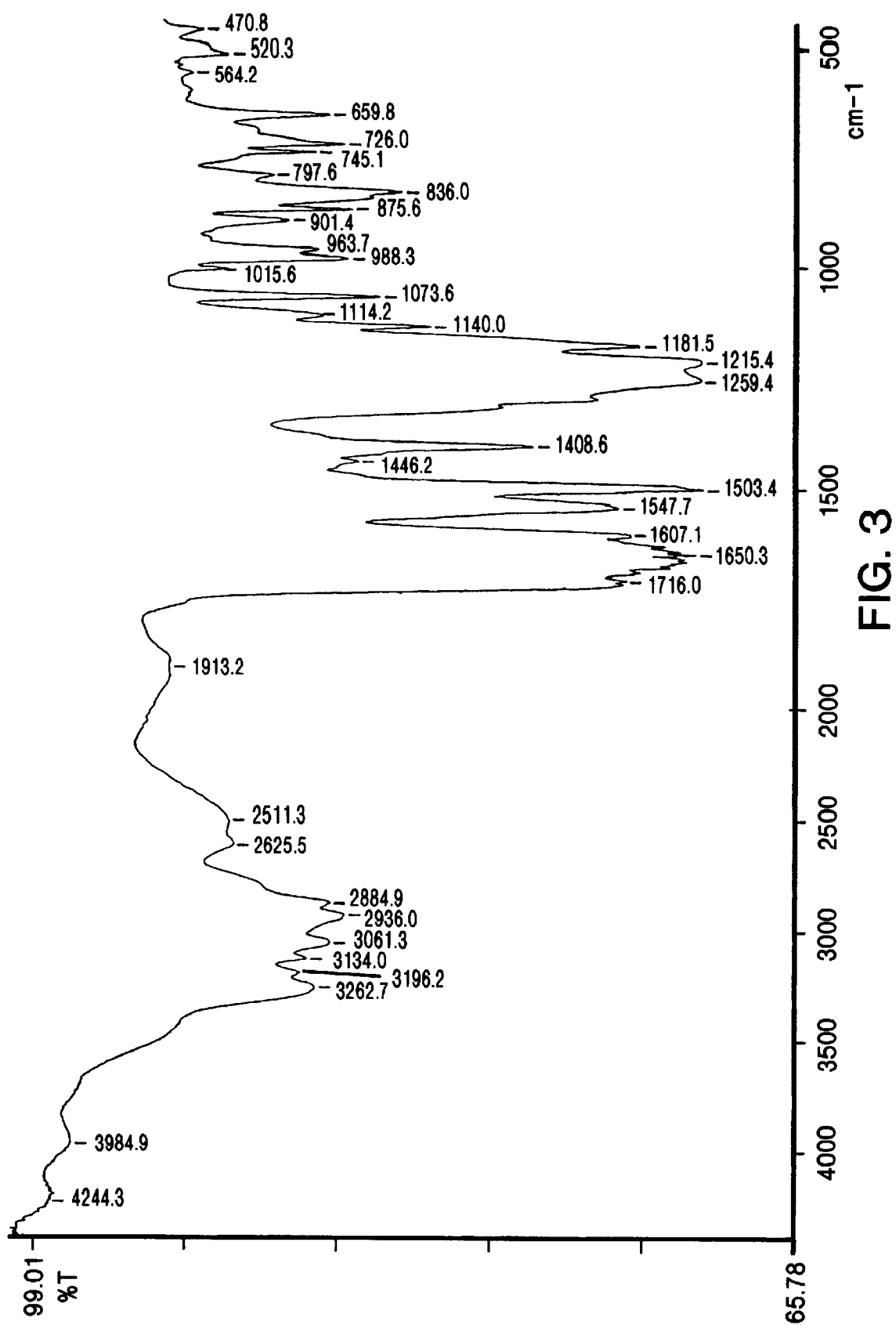
FIG. 3 shows the FT-IR spectrum of the polyamic acid film prepared by reacting hexafluoroisopropylidene dianhydride (6FDA) with 4,4'-oxy-dianiline (ODA).
Figure 4:
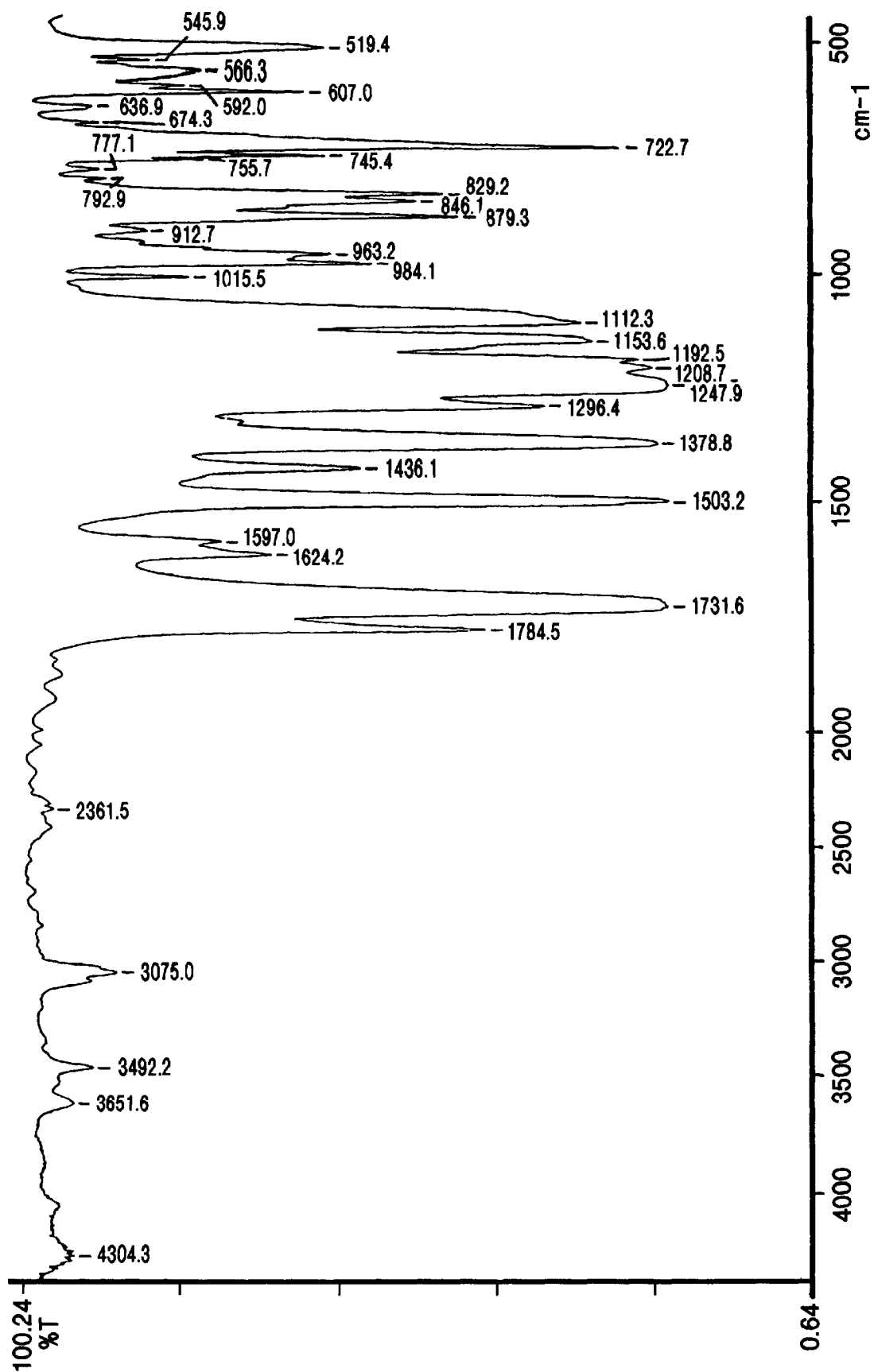
FIG. 4 shows the FT-IR spectrum of the triethylamine salt of the 6FDA-ODA polyamic acid.
Figure 5:
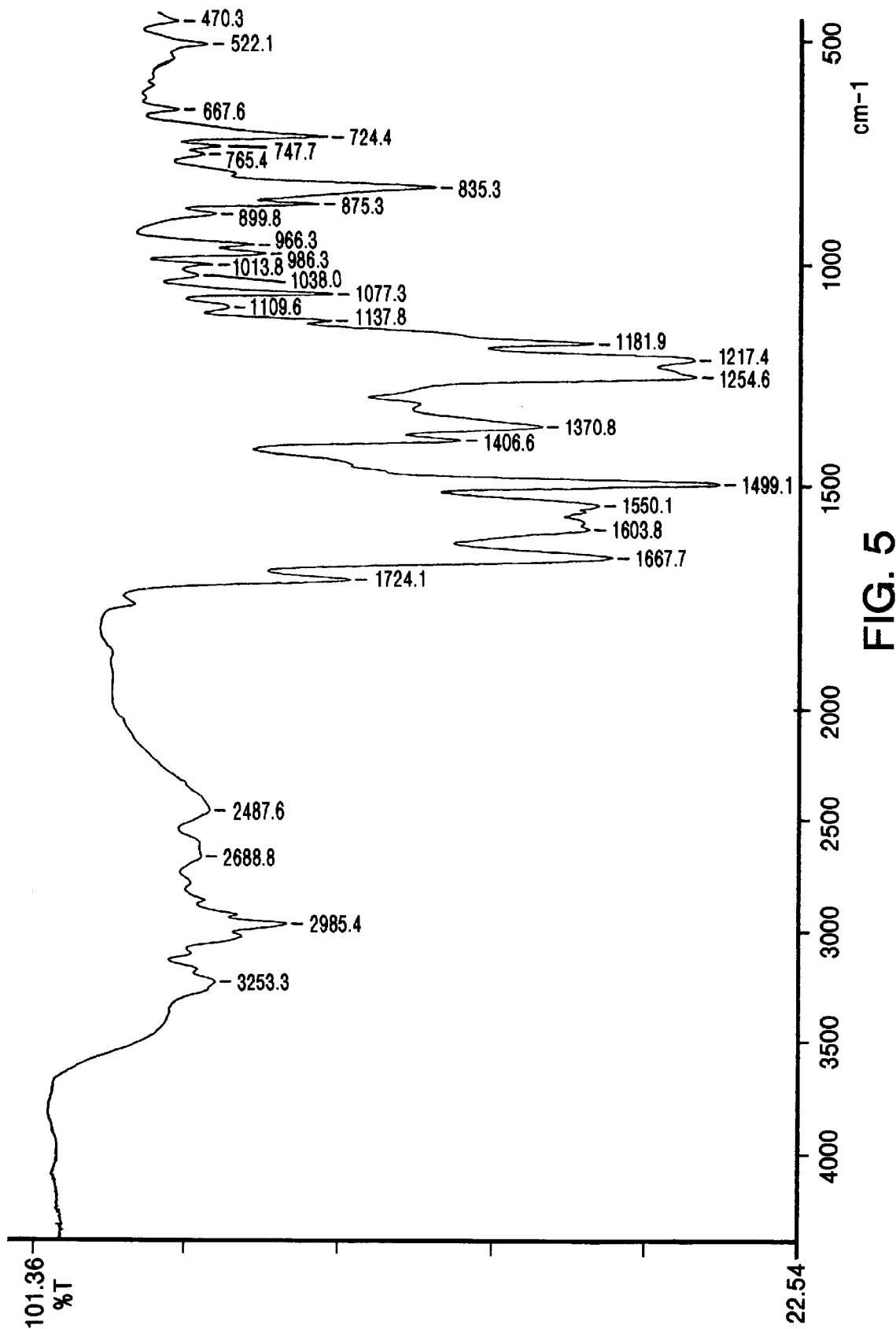
FIG. 5 shows the FT-IR spectrum of the polyimide film prepared from the precursor 6FDA-ODA triethylamine PAAS film shown in FIG. 4. The polyimide film was prepared by heating the film first at 80° C. for 8 hours and then at 150° C. for 24 hours under vacuum.
Figure 6:
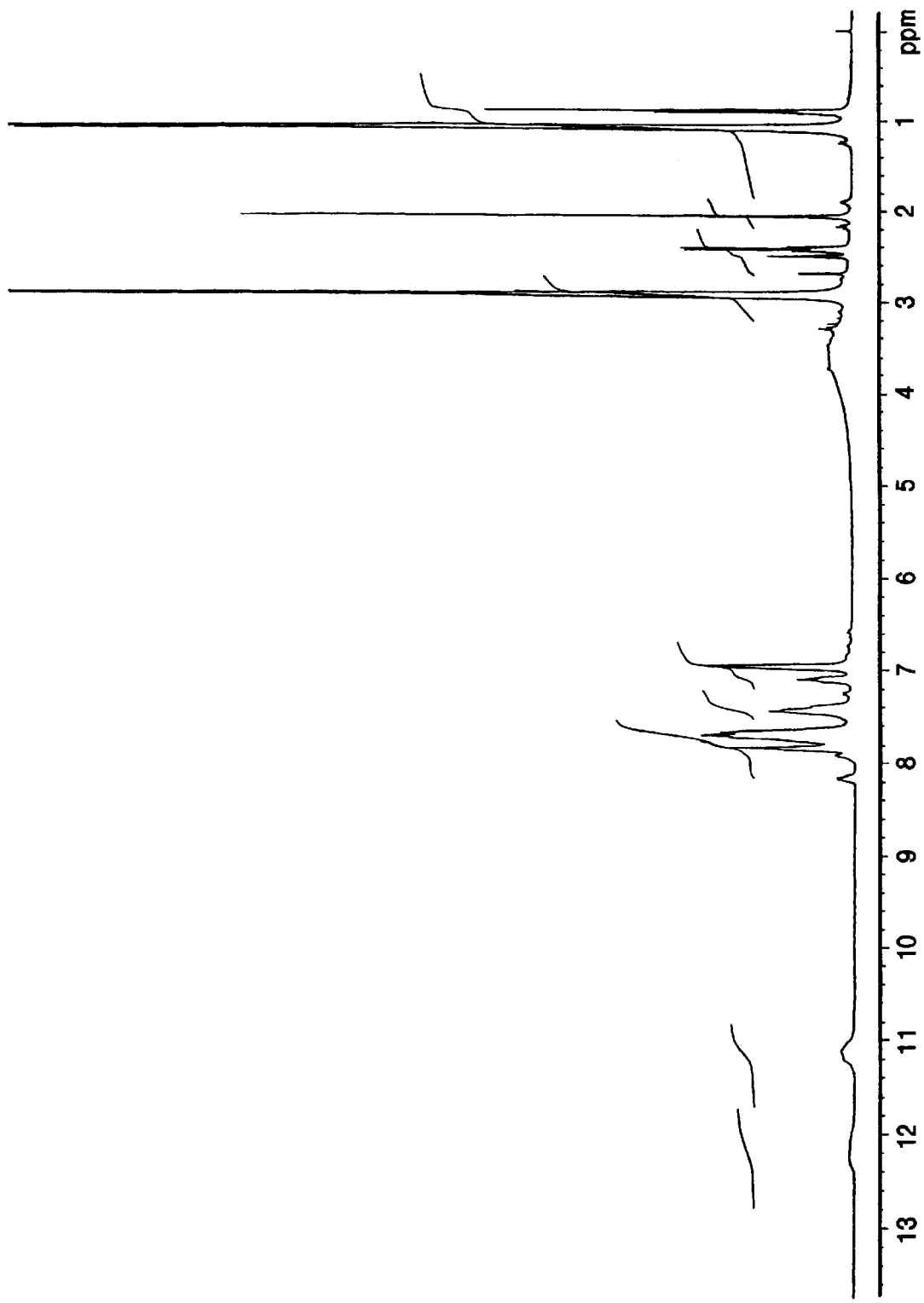
FIG. 6 shows the H-NMR spectrum of the triethylamine salt of 6FDA-ODA PAAS.
Figure 7:
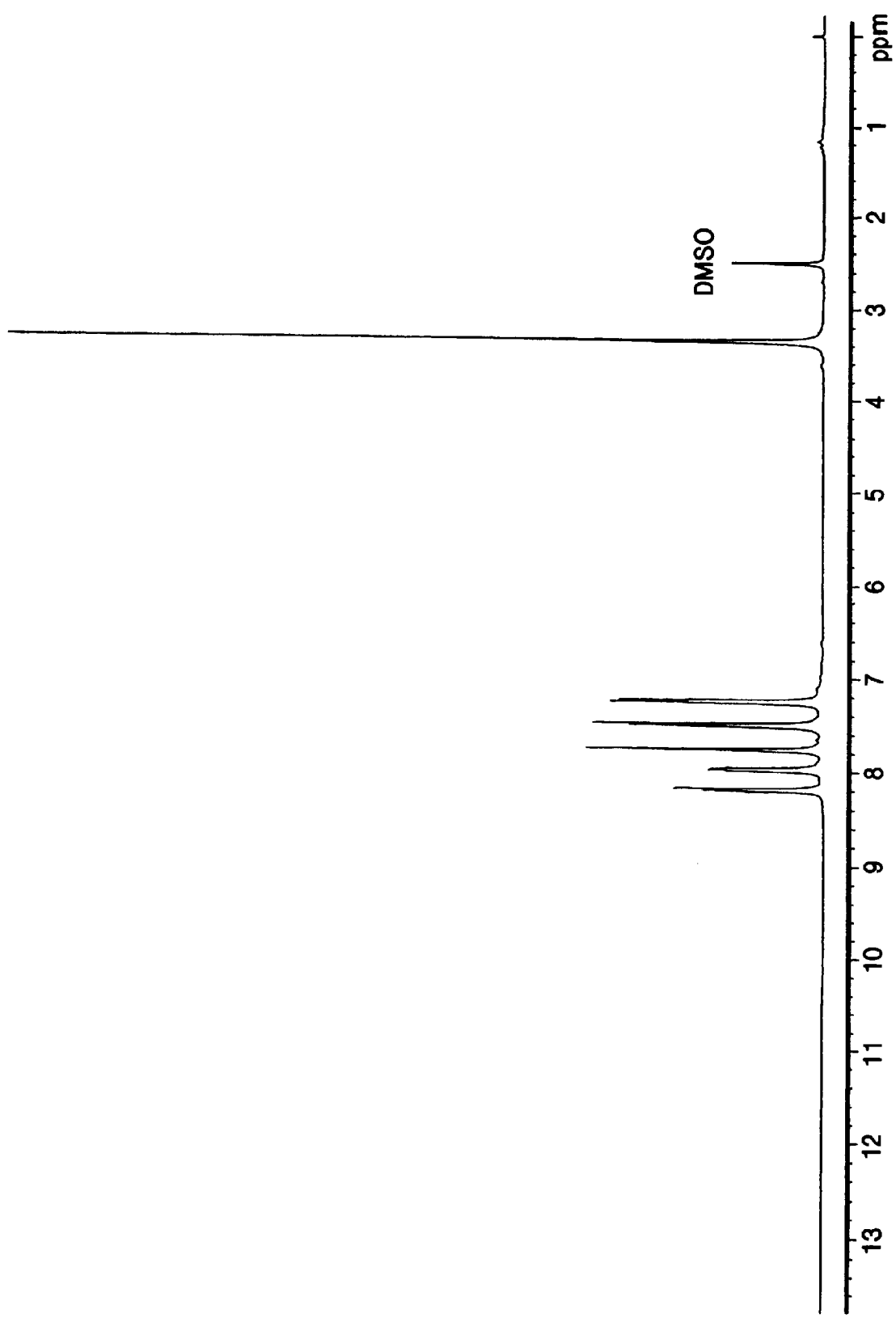
FIG. 7 shows the H-NMR spectrum of the 6FDA-ODA polyimide prepared from the precursor 6FDA-ODA triethylamine PAAS.

The FT-IR spectra of 6FDA-ODA polyamic acid, 6FDA-ODA polyamic salt precursor and 6FDA-ODA polyimides are shown in FIGS. 3, 4 and 5, respectively. The H-NMR spectra of 6FDA-ODA polyamic acid salt and polyimide are shown in FIGS. 6 and 7, respectively.

EXAMPLE 4

Polyamic acid from 6FDA and 4,4-phenylenediamine (PDA) was prepared following the general procedure described in Example 3. Triethylamine was used to form the 6FDA-PDA PAAS. Fibrous PAAS was recovered by precipitation into a large amount of acetone and dried. The PAAS film was cast from methanol and heat treated as described in Example 3. The gas permeation properties of the polyimide film were measured at 50° C. and determined to be follows:

P(He)=55.9 barrers

P(O$_2$)=5.5 barrers

P(N$_2$)=1.2 barrers

P(CH$_4$)=0.7 barrers

P(CO$_2$)=24.4 barrers

Overall, $\alpha$(O$_2$/N$_2$)=4.7, $\alpha$(CO$_2$/CH$_4$)=33.7

EXAMPLE 5

Polyamic acid from BTDA and 6FDAn was prepared following the procedure described in Example 1. DABCO was used to form BTDA-6FDAn PAAS. Fibrous polymer was recovered by precipitation into isopropanol and dried. The PAAS film was cast from methoxyethanol. The film was first dried at 50° C. under vacuum overnight. The dried film was further heat treated at 100° C. for 8 hours and subsequently at 150° C. for 24 hours under vacuum. The gas permeation properties of this polyimide film were measured at 50° C. and the results are listed in Table 2.

EXAMPLE 6

BTDA-6FDAn polyimide film was prepared following the procedures described in Example 5 except that tributylamine was used to form PAAS. The measured gas permeation properties of this film are listed in Table 2.

EXAMPLE 7

BTDA-6FDAn polyimide film was prepared following the procedures described in Example 5 except that trihexylamine was used to form PAAS. The measured gas permeation properties of this film are listed in Table 2.

EXAMPLE 8

BTDA-6FDAn polyimide film was prepared following the procedures described in Example 5 except that dimethyldodecylamine was used to form PAAS. The measured gas permeation properties of this film are listed in Table 2.

EXAMPLE 9

6FDA-ODA polyimide film was prepared following the procedures described in Example 3 except that DABCO was used to form PAAS and the film was cast from methoxyethanol. The measured gas permeation properties of this film are listed in Table 1.

EXAMPLE 10

6FDA-ODA polyimide film was prepared following the procedures described in Example 3 except that tributylamine was used to form PAAS and the film was cast from methoxyethanol. The measured gas permeation properties of this film are listed in Table 1.

EXAMPLE 11

6FDA-ODA polyimide film was prepared following the procedures described in Example 3 except that trihexylamine was used to form PAAS and the film was cast from methoxyethanol. The measured gas permeation properties of this film are listed in Table 1.

gas permeation characteristics can be prepared following the teachings of the present invention

EXAMPLE 12

The polyamic acid salt from BTDA and 6FDAn was prepared as described in example 1. A 1.0% methoxyethanol solution was prepared from the PAAS polymer and coated on a porous polysulfone hollow fiber. The composite membrane was further overcoated with a solution of cross-linkable polysiloxane Sylgard 184, Dow Corning Co., 3.0% by weight in cyclohexane. The resulting composite membrane was heat treated at 125° C. for 62 h and the gas permeation properties of the prepared membrane were measured at 50° C. The composite hollow fiber membrane exhibited a gas separation factor of 5.6 for oxygen/nitrogen separation and a permeance of $7.3 \times 10^{-6}$ cm$^3$(stp)/cm$^2$.cmHg.sec for oxygen and a separation factor of 29.8 for $CO_2/CH_4$ separation at a permeance of $1.8 \times 10^{-5}$ cm$^3$(stp)/cm$^2$.cmHg.sec for $CO_2$.

What is claimed is:

1. A process for separating one or more gases from a mixture of gases comprising the step of bring the gaseous mixture into contact with a first side of a composite polyimide gas separation membrane, such that a portion of said gas mixture permeates to a second side of said membrane and a portion of said gas mixture is collected as a nonpermeate, the resulting gas mixture on said second side of said membrane being enriched in one or more components over that of the mixture on the first side of said membrane, wherein said composite gas separation membrane is formed by: (a) synthesizing a polyamic acid salt polymer in an aprotic solvent; (b) recovering said polyamic acid salt polymer from said aprotic solvent; c) forming a solution of said polyamic acid salt polymer in a coating solvent system; (d) applying said coating solvent system to a porous substrate to form a coating layer on said porous substrate; (e) solidifying said coating layer by drying, or by

TABLE 1

Gas permeation properties of 6FDA-ODA polyimide films prepared from different PAAS precursors (permeability coefficients in Barrers).

|  | Example No. | No. | P (CO$_2$) | P (N$_2$) | P (O$_2$) | P (CH$_4$) | P (He) |
|---|---|---|---|---|---|---|---|
| DABCO | 9 | 1 | 5.02 | 0.19 | 1.08 | 0.13 | 20.79 |
| Triethalamine | 3 | 2 | 23.31 | 1.13 | 5.06 | 0.87 | 42.17 |
| Tributylamine | 10 | 3 | 39.78 | 2.28 | 9.02 | 2.38 | 58.55 |
| Trihexylamine | 11 | 4 | 89.47 | 6.4 | 22.6 | 7.72 | 89.14 |

TABLE 2

Gas permeation properties of BTDA-6FDAn polyimide films prepared from different PAAS precursors (permeability coefficients in Barrers).

|  | Example No. | No. | P (CO$_2$) (barr) | P (N$_2$) (barr) | P (O$_2$) (barr) | P (CH$_4$) (barr) | P (He) (barr) |
|---|---|---|---|---|---|---|---|
| DABCO | 5 | 1 | 2.99 | 0.11 | 0.71 | 0.07 | 18.09 |
| Dimethyl-dodecylamine | 8 | 2 | 8.67 | 0.43 | 2.18 | 0.31 | 28.46 |
| — | 2 | 3 | 9.67 | 0.49 | 2.77 | 0.26 | 42.34 |
| Tributylamine | 6 | 4 | 32.04 | 1.68 | 7.42 | 1.7 | 63.31 |
| Trihexylamine | 7 | 5 | 77.96 | 5.71 | 19.67 | 6.99 | 71.79 |

The data presented in Tables 1 and 2 show that polyimide membranes of the same chemical structure but with different immersing the coated substrate into a nonsolvent or by a combination thereof to form a solidified coating layer; and (f) converting said polymeric acid salt coating layer into a polyimide layer, thus forming a composite polyimide gas separation membrane.

2. The process of claim 1 wherein said coating solvent system is a solvent system containing one or more alcohols and their mixtures with water.

3. The process of claim 2 wherein said coating solvent system is selected from the group consisting of methanol, ethanol, isopropanol, mixtures thereof, or their mixtures with water.

4. The process of claim 2 wherein said coating solvent system is comprised of an alcohol and at least one other solvent.

5. The process of claim 1 wherein said polyamic acid salt contains ammonia, protonated tertiary amine, quaternary amine, phosphonium or sulfonium counter ion or mixtures thereof.

6. The process of claim 5 wherein said polyamic acid salt contains residual polyamic acid groups.

7. The process of claim 5 wherein said polyamic acid salt contains at least one protonated tertiary amine.

8. The process of claim 7 wherein the tertiary amine is trimethylamine, triethylamine, or tributylamine.

9. The process of claim 1 wherein said polyimide layer is comprised of an aromatic polyimide of the following formula:

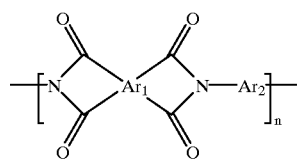

Where

is independently

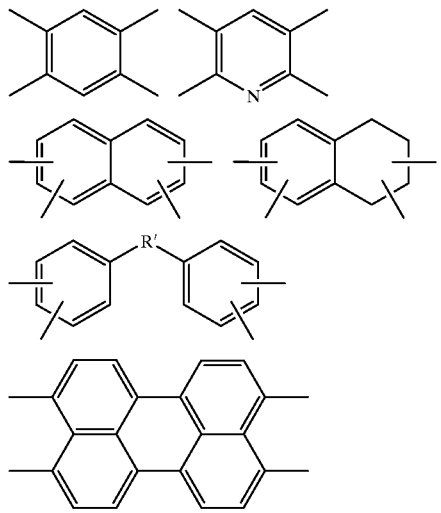

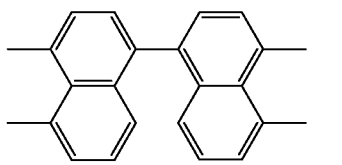

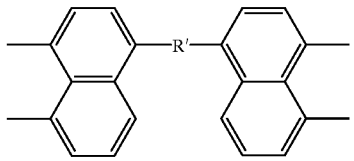

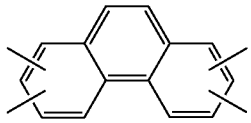

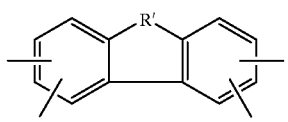

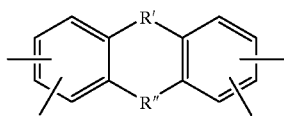

or mixtures thereof;

—R'— is

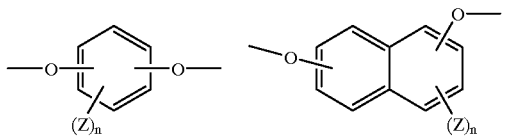

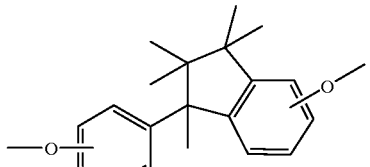

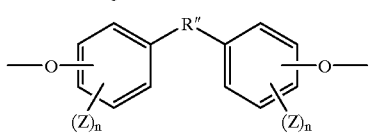

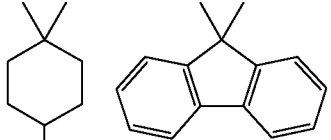

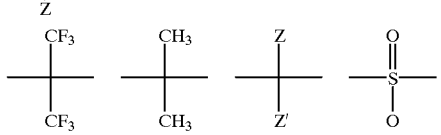

-continued

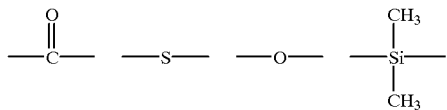

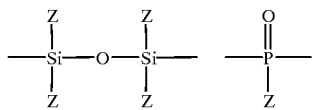

—R"— is

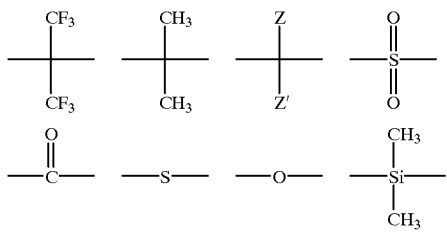

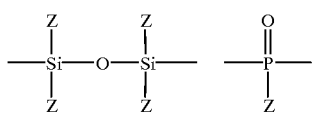

z and Z' are:

—H, —$CH_3$, —$CH_2CH_3$, —$CH_2CH_2CH_3$, iso-propyl, iso-butyl, tert-butyl, —Br, —Cl, —F, —$NO_2$, —CN

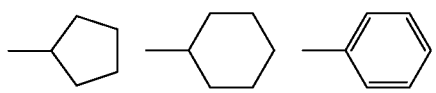

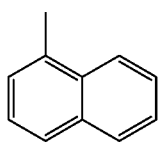

where —$Ar_2$— is independently

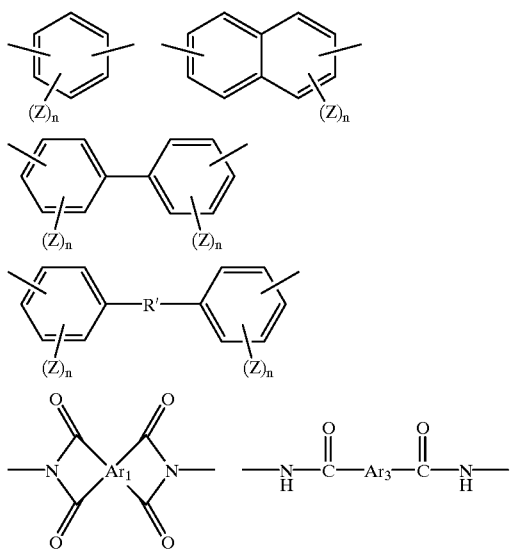

or mixtures thereof; where $Ar_1$ is defined as above;
—$Ar_3$— is

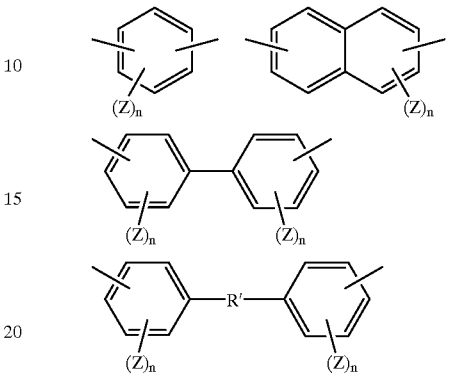

and n is an integer.

10. The process of claim 1 wherein said polyimide in step (f) is formed by either subjecting said composite membrane to a heat treatment above 100° C. or by a chemical imidization.

11. The process of claim 1, wherein a caulking procedure is applied to either said solidified coating layer or said polyimide layer or both, to repair surface layer defects.

12. The process of claim 11 wherein said caulking procedure comprises the application of a silicone rubber caulking layer.

13. The process of claim 1, wherein said porous substrate is comprised of a material selected from the group consisting of aromatic polyamides, aliphatic polyamides, polyesters, polycarbonates, copolycarbonatesesters, polyethers, polyetherketones, polyetherimides, polyethersulfones, polyetheresters, polysulfones, polyvinylidene fluoride, polybenzimidazoles, polybenzoxazoles, polyacrylonitrile, polyazoaroaromatics, poly(2,6-dimethylphenylene oxide), polyphenylene oxides, polyureas, polyurethanes, polyhydrazides, polyazomethines, polyacetals, cellulosic derivatives, cellulose acetates, cellulose nitrate, ethyl cellulose, styrene-acrylonitrile copolymers, brominated poly(xylene oxide), sulfonated poly(xylylene oxide), polyquinoxaline, polyamideimides, polyamideesters, polyacetylenes, polyphosphazenes, polyolefines, polyethylene, polypropylene, polyphenylenes, poly(4-methylpentene), poly(trimethylsilylpropyne), polyimides, polyesters, ladder polymers, blends thereof, copolymers thereof and substituted polymers thereof, carbon, ceramic and silica.

14. The process of claim 1 wherein the said porous substrate is selected from the group consisting of tubular, flat sheets or hollow fiber substrates.

15. A process for separating one or more gases from a mixture of gases comprising the steps of bringing the gaseous mixture into contact with a first side of a polyimide gas separation membrane such that a portion of said gas mixture permeates to a second side of said membrane and a portion of said gas mixture is collected as a nonpermeate, the resulting gas mixture on said second side of said membrane being enriched in one or more components over that of the mixture of the first side of said membrane, wherein said polyimide gas separation membrane is formed by: (a) preparing a membrane casting solution containing a polyamic acid salt polymer in at least one polar solvent; (b) forming a membrane configuration shaped as a flat sheet, as a tube or as a hollow fiber from the polyamic acid salt polymer solution; (c) bringing said membrane configuration into contact with a coagulating liquid to form a solidified membrane of said polyamic acid salt polymer; (d) washing said solidified membrane of said polyamic acid salt polymer to remove at least one polar solvent; (e) drying said solidified membrane of said polyamic acid salt; and (f) converting said solidified membrane of said polyamic acid salt polymer into a polyimide gas separation membrane by heat or chemical treatment.

16. A process of claim 15 wherein said polyimide is an aromatic polyimide of the following formula:

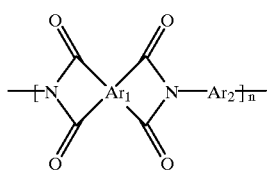

Where

is independently

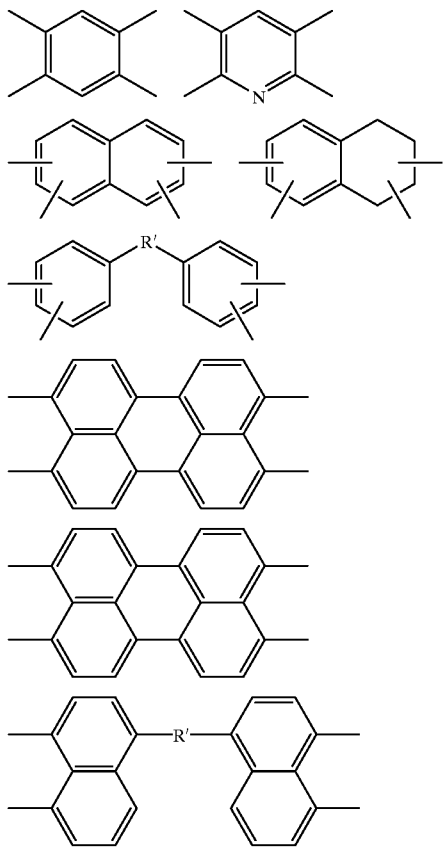

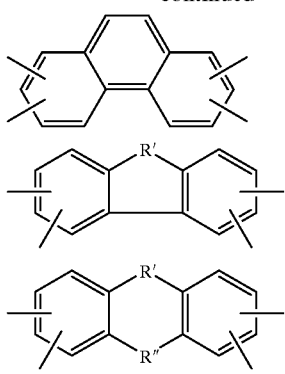

or mixtures thereof;

—R'— is

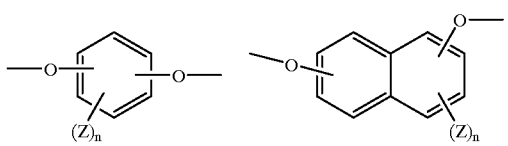

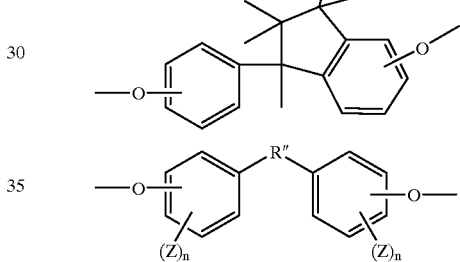

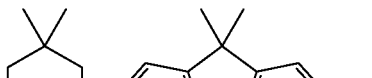
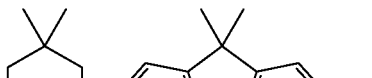
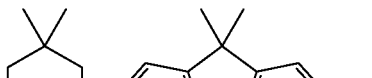
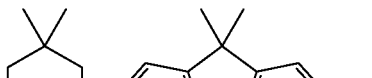
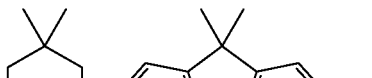
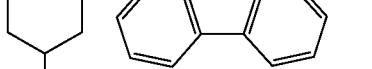
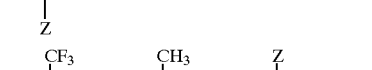
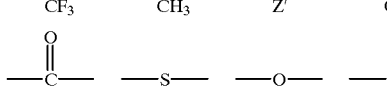

—R"— is

-continued

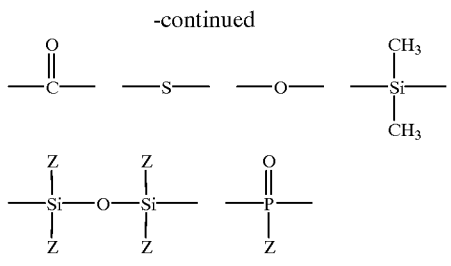

z and Z' are:

—H, —CH₃, —CH₂CH₃, —CH₂CH₂CH₃, iso-propyl, iso-butyl, tert-butyl, —Br, —Cl, —F, —NO₂, —CN

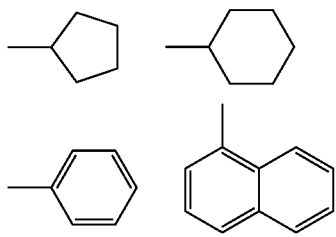

where —Ar₂— is independently

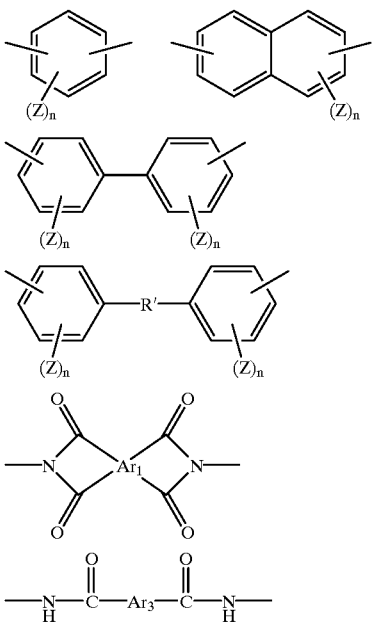

or mixtures thereof; where Ar₁ is defined as above;

—Ar₃— is

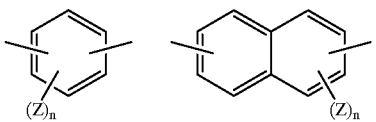

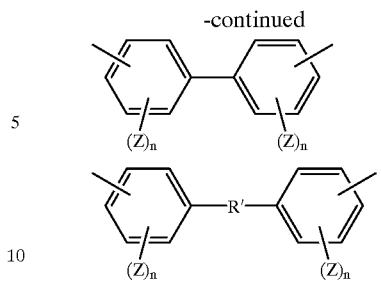

and n is an integer.

17. A process of claim 16 wherein said polyamic acid salt contains residual acid groups.

18. A process of claim 16 wherein said polyamic acid salt contains counter ions derived from ammonia, quarternary amines, protonated tertiary amines, and sulfonium or phosphonium ions.

19. A process of claim 16 wherein said polyimide membrane is formed by subjecting said solidified membrane of said polyamic acid salt polymer to a heat treatment above 100° C.

20. The process of claim 16, wherein a caulking procedure is applied to either said solidified membrane of said polyamic acid salt or said polyimide layer or both, to repair surface layer defects.

21. A process of claim 20 wherein said caulking procedure comprises the application of a silicone rubber caulking layer.

22. A process of claim 20 wherein said caulking procedure is a solvent exchange procedure or a surfactant treatment procedure.

23. A process of claim 16 wherein said solidified and washed polyamic acid salt polymer membrane is further subjected to a solvent exchange dehydration process.

24. A process of claim 16 further comprising the step of conveying said membrane configuration through an evaporation zone after step (b) and before step (c).

25. A polyimide gas separation membrane manufactured by the process comprising: (a) forming a membrane from a polyamic acid salt membrane precursor that contains the following units in its structure:

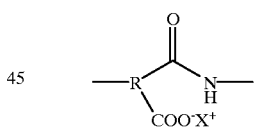

wherein R is a substituted or unsubstituted aromatic, alicylcic, heterocyclic, or aliphatic radical, X is an ammonium ion, a phosphonium ion, a sulfonium ion, a quaternary amine ion that can be a heterocyclic, alicylic, or an aromatic amine ion or an ion of the following general formula: $R_1R_2R_3R_4N^+$, or a protonated tertiary amine that is either alicyclic or aromatic, or an amine of the following general formula: $R_1R_2R_3NH$, or a mixture thereof; wherein $R_1$, $R_2$, $R_3$, and $R_4$ are the same or different and are aryl radials or alkyl radials having fewer than 15 carbon atoms; and (b) converting the membrane formed from said polyamic acid salt membrane precursor into said polyimide membrane by thermal or chemical treatment.

26. A polyimide membrane of claim 25 wherein said polyamic acid salt membrane precursor is formed by neutralization of a preformed polyamic acid membrane.

27. The polyimide membrane of claim 25 wherein said polyamic acid salt membrane precursor is a partially imidized polyamic acid salt.

28. The polyimide membrane of claim 25 wherein said polyamic acid salt contains residual polyamic acid groups.

29. A process for the production of a porous polyimide membrane comprising: (a) forming a porous membrane of either a polyamic acid salt polymer or a blend of polyamic salt polymer and a polyimide; (b) converting said porous membrane into said porous polyimide membrane by heat or chemical treatment.

30. The process of claim 29 wherein said polyamic acid salt polymer is partially imidized.

31. The porous polyimide membrane of claim 29 wherein said polyimide is an aromatic polyimide of the following general formula:

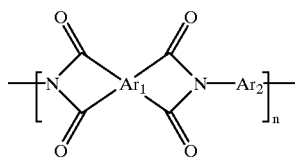

Where

is independently

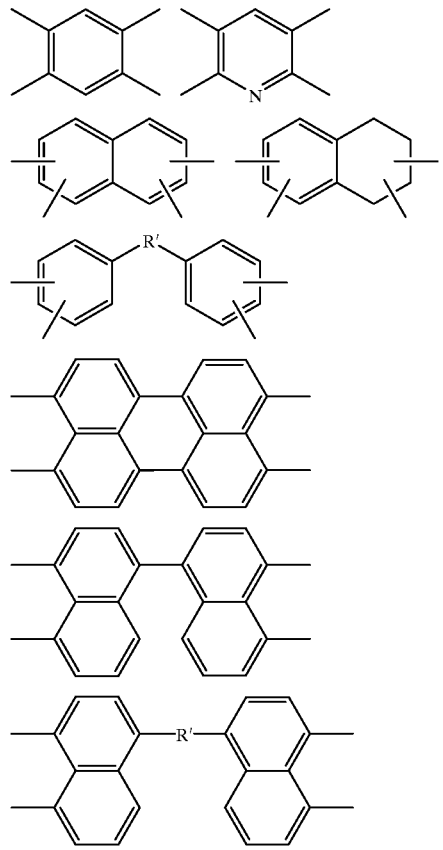

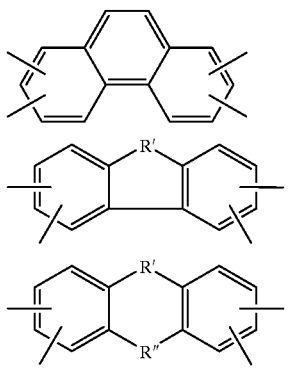

or mixtures thereof;

—R'— is

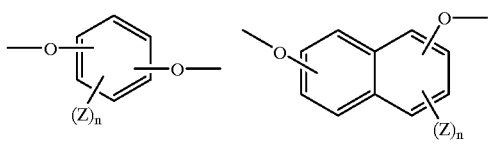

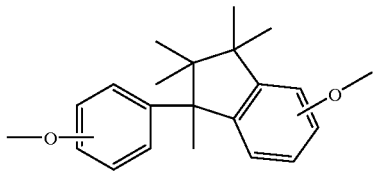

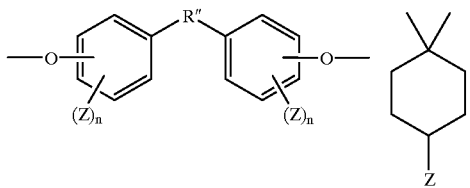

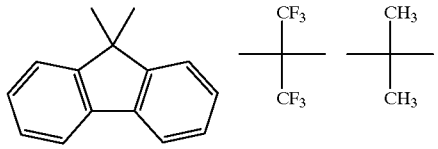

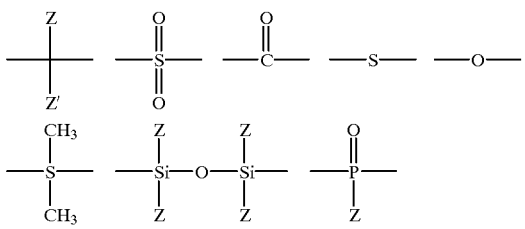

—R"— is

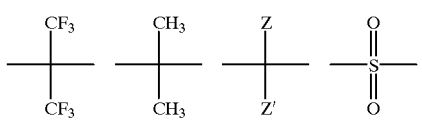

-continued
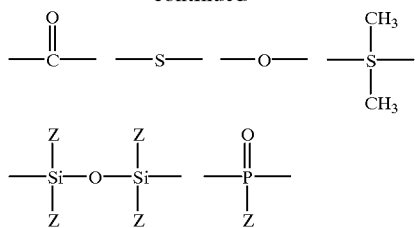
z and Z' are:
—H, —CH$_3$, —CH$_2$CH$_3$, —CH$_2$CH$_2$CH$_3$, iso-propyl, iso-butyl, tert-butyl, —Br, —Cl, —F, —NO$_2$, —CN
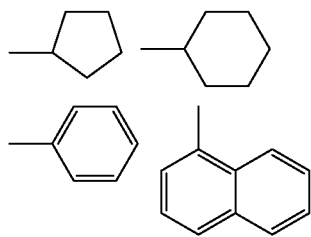
where —Ar$_2$— is independently
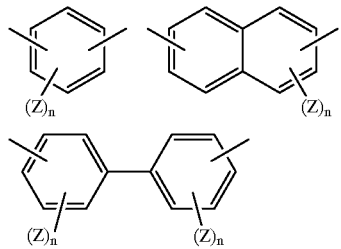
-continued
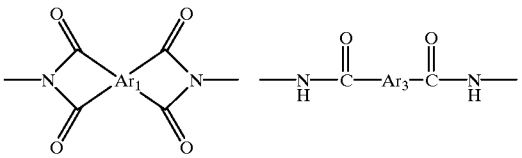
or mixtures thereof; where Ar$_1$ is defined as above;
—Ar$_3$— is
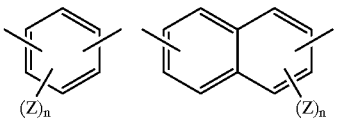
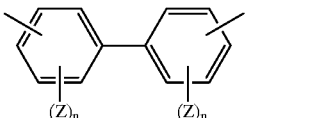
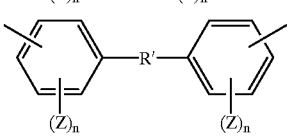
and n is an integer.
* * * * *